US007877352B2

(12) United States Patent
Hempleman et al.

(10) Patent No.: US 7,877,352 B2
(45) Date of Patent: Jan. 25, 2011

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Associates, LLC, Chicago, IL (US)

( * ) Notice: Subject to any disclaimer, the term of this patent is extended or adjusted under 35 U.S.C. 154(b) by 744 days.

(21) Appl. No.: 11/932,488

(22) Filed: Oct. 31, 2007

(65) Prior Publication Data

US 2008/0133037 A1 Jun. 5, 2008

Related U.S. Application Data

(63) Continuation of application No. 10/841,374, filed on May 7, 2004, now abandoned, which is a continuation of application No. 09/770,882, filed on Jan. 26, 2001, now Pat. No. 6,763,345, which is a continuation of application No. 08/859,995, filed on May 21, 1997, now Pat. No. 6,243,725.

(51) Int. Cl.
*G06F 17/30* (2006.01)
(52) U.S. Cl. .................. 707/610; 707/609; 707/640; 707/690; 707/791; 707/822
(58) Field of Classification Search .......... 707/600–831
See application file for complete search history.

(56) References Cited

U.S. PATENT DOCUMENTS 5,168,481 A * 12/1992 Culbertson et al. ............. 369/2

OTHER PUBLICATIONS

Apple Computer, Amended Answer in Civil Action No. 2-05CV-506.
Premier International, Answer to Counterclaims in Civil Action No. 2-05CV-506.
Premier International, Motion to Strike in Civil Action No. 2-05CV-506.
Apple Computer, Opposition to Motion to Strike in Civil Action No. 2-05CV-506.
Premier International, Reply to Opposition to Motion to Strike in Civil Action No. 2-05CV-506.
Premier International, Opening Claim Construction Brief in Civil Action No. 2-05CV-506.
Apple Computer, Claim Construction Brief in Civil Action No. 2-05CV-506.

(Continued)

*Primary Examiner*—Isaac M Woo
(74) *Attorney, Agent, or Firm*—Eugene M. Cummings, P.C.

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

1 Claim, 32 Drawing Sheets

OTHER PUBLICATIONS

Premier International, Reply to Claim Construction Brief in Civil Action No. 2-05CV-506.
Judge Everinghman, Markman Order in Civil Action No. 2-05CV-506.
Court Transcript, Markman Hearing Minutes in Civil Action No. 2-05CV-506.
N/A, Docket Report for Civil Action No. 2-05CV-506.
Schneider, Deposition of Neil Schneider Transcript—Part 1, Jul. 11, 2007.
Schneider, Deposition of Neil Schneider Transcript—Part 2, Jul. 11, 2007.
Novacek, Deposition of Eugene Novacek Transcript, May 30, 2007.
Hempleman, Deposition of James Hempleman Transcript, Part 1, Jan. 25, 2007.
Hempleman, Deposition of James Hempleman Transcript, Index, Jan. 25, 2007.
Hempleman, Deposition of James Hempleman Transcript, Part 2, Jan. 26, 2007.
Hempleman, Deposition of Sandra Hempleman Transcript—Part 1, May 23, 2007.
Hempleman, Deposition of Sandra Hempleman Transcript—Part 2, May 23, 2007.
Hempleman, Deposition of Sandra Hempleman Transcript—Part 3, May 23, 2007.
Hempleman, Deposition of Sandra Hempleman, Index, May 23, 2007.
Unknown, Music Databases, Unknown publication date, MP3 Developments.
Office Action for U.S. Appl. No. 09/770,882 mailed Dec. 18, 2002.
Petition for Extension of Time Under 37 CFR 1.136(a) for U.S. Appl. No. 09/770,882 received Feb. 14, 2003.
Office Action for U.S. Appl. No. 09/770,882 mailed May 7, 2003.
Applicant Transmittal Letter U.S. Appl. No. 09/770,882 received Aug. 11, 2003.
Office Action for U.S. Appl. No. 09/770,882 mailed Nov. 4, 2003.
Interview Summary for "List Building System" U.S. Appl. No. 09/770,882 received Feb. 9, 2004.
Amendment E for "List Building System" U.S. Appl. No. 09/770,882 received Feb. 9, 2004.
Notice of Allowance and Fee(s) Due mailed Mar. 9, 2004 for U.S. Appl. No. 09/770,882.
Office Action for U.S. Appl. No. 09/770,882 mailed Mar. 15, 2004.
Transmittal Form, U.S. Appl. No. 09/770,882, May 5, 2005.
Alpha Books: The Complete Idiot's Guide to Windows 95 Second Edition by Paul McFedries; Copyright 1997.
Microsoft: The Complete Idiot's Guide to Windows 95 by Paul McFedries with Faithe Wempen; Copyright 1995.
Selector Manual: Radio Computing Services, Inc. Scarsdale, New York; Copyright 1979.
Selector The Music System Manual Jan. 1991 (Selector Manual).
Enco Systems, DAD486x Digital Audio Delivery System Brochure, 1995.
Enco Systems, DAD486x Digital Audio Delivery System Operation Manual; Verion 6.0A, Copyright 1995.
Master Control Manual; The Paperless and Cartless Studio System; Version 3.03, Copyright 1994.

* cited by examiner

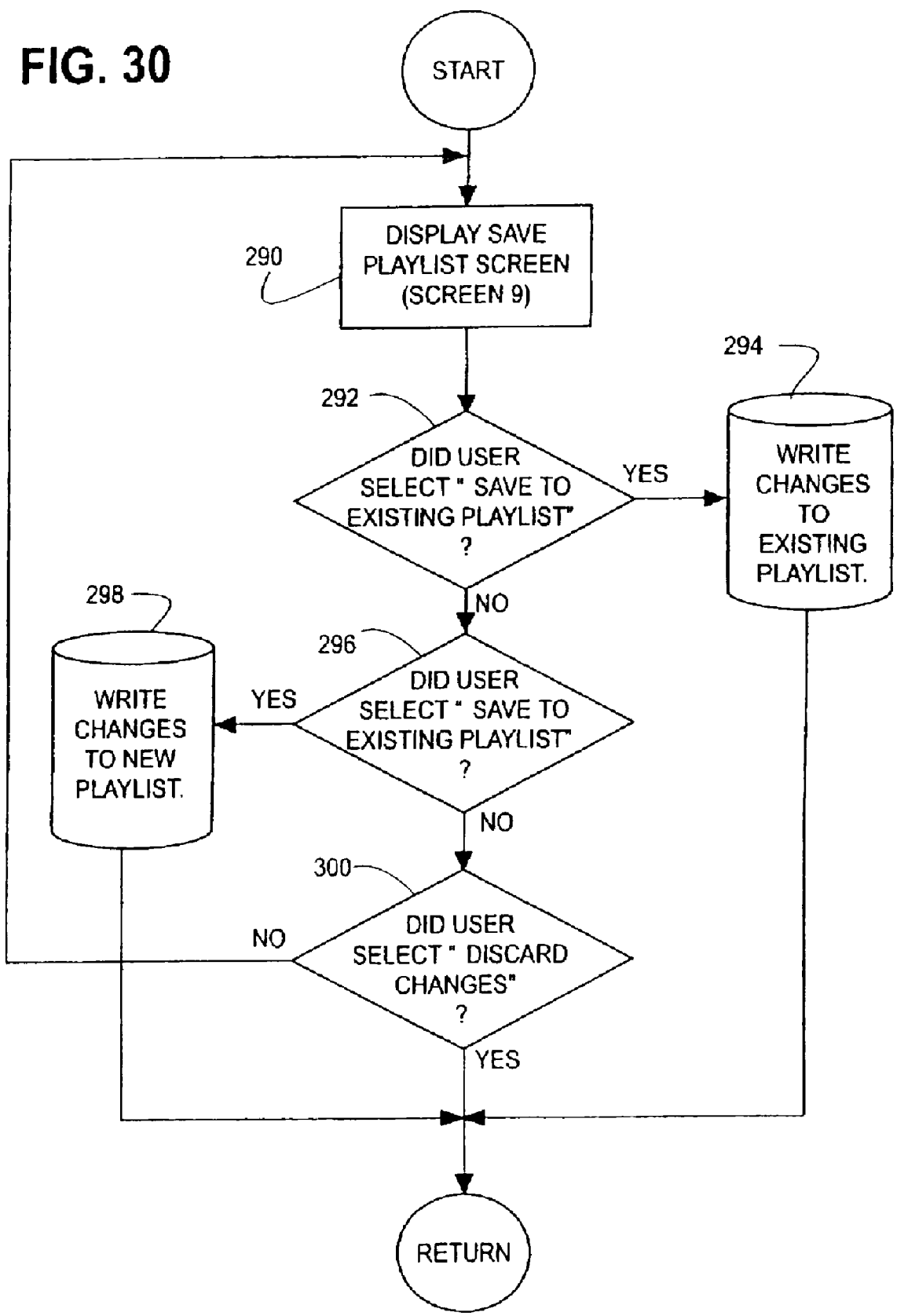

FIG. 4G

PlayList Editor

File  Options  Tables  Help

Recorder | PlayList Editor | PlayList Player | Reports

Media Inventory  [Change Selection]

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | Rock N Roll | | 4/21/97 | 2:12 | yes |
| Help me Rhonda | Jan & Dean | Rock N Roll | | 4/29/97 | 2:56 | yes |
| I believe in you and me | Houston, Whitney | Bluegrass | | 4/29/97 | 4:02 | yes |
| Let it flow | Braxton, Toni | Pop | Audio only | 4/18/97 | 4:27 | yes |
| Little Honda | Hondells | Rock N Roll | | 4/21/97 | 2:02 | yes |
| My heart is calling | Houston, Whitney | Pop | | 4/29/97 | 4:15 | yes |

Destination PlayList  [Change PlayList] [Save PlayList]  Title: [Dinner music 1]  Total Play: [1:38:45]

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Pop | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

[▲ Play]  [■ Stop]

Volume  L  R

Current Time: [06:54 pm]

FIG. 41

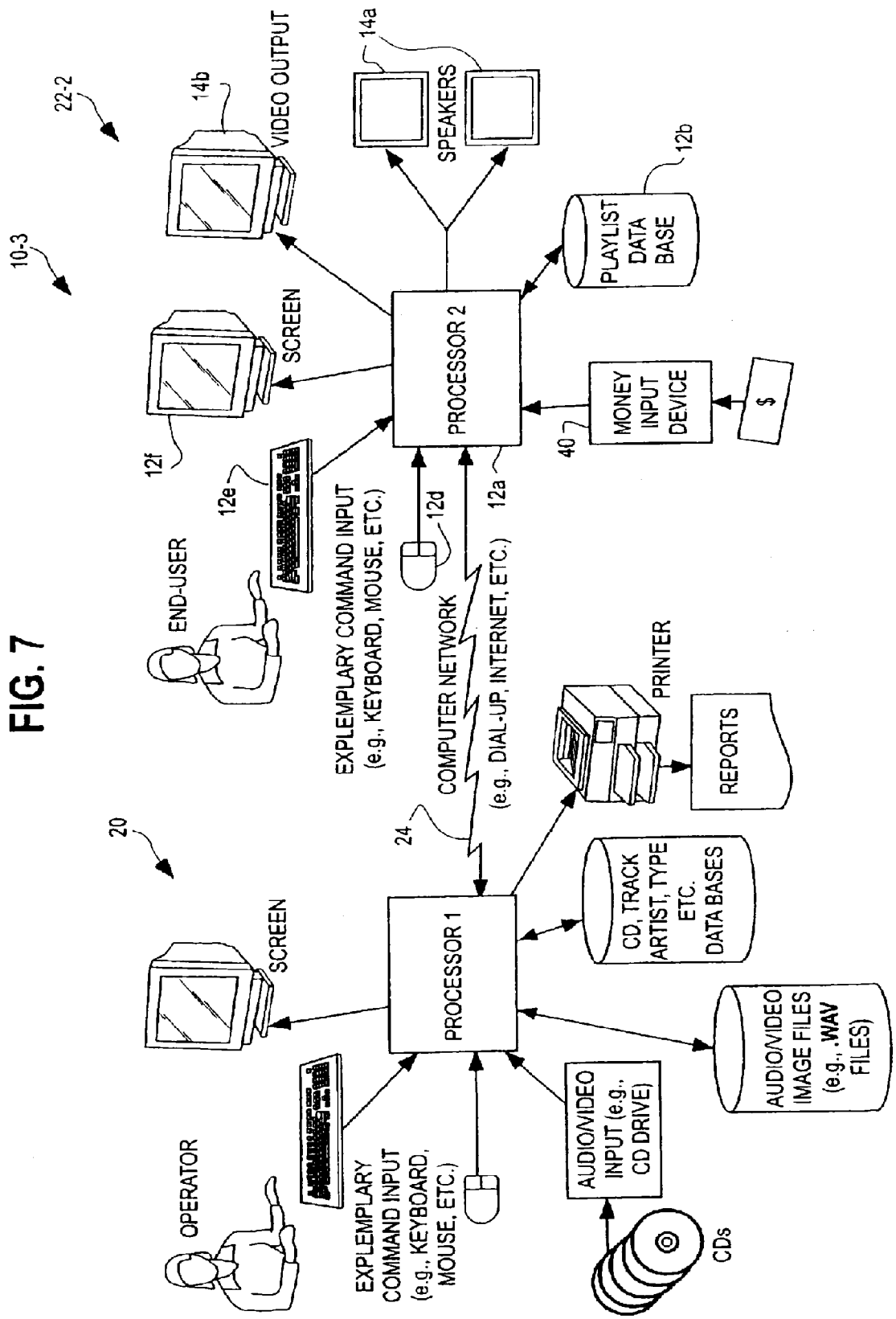

LIST BUILDING SYSTEM

CROSS REFERENCE TO RELATED APPLICATIONS

This application is a continuation application of U.S. patent application Ser. No. 10/841,374 filed May 7, 2004 now abandoned and entitled "LIST BUILDING SYSTEM," which is a continuation of U.S. patent application Ser. No. 09/770,882 filed on Jan. 26, 2001 entitled "LIST BUILDING SYSTEM", now U.S. Pat. No. 6,763,345 issued Jun. 14, 2004, which is a continuation of U.S. patent application Ser. No. 08/859,995 filed on May 21, 1997 entitled "LIST BUILDING SYSTEM", now U.S. Pat. No. 6,243,725 issued Jun. 5, 2001.

FIELD OF THE INVENTION

The invention pertains to software driven systems and methods for developing audio/video sequences. More particularly, the invention pertains to such system and methods wherein a user can create an editable list of works which can be presented.

BACKGROUND OF THE INVENTION

With the advent of CDs a wide variety of music, music videos or video sequences are conveniently available for a user in a non-analog, digital format. The advantages of digital recording of both audio and video have been recognized and are to a great extent realized with the ready availability of pre-recorded CDs.

While convenient, pre-recorded CDs present a problem to a user in that while it is possible to select sequentially between the pre-recorded works on a given CD, to switch to another artist or group it is necessary to have multiple drives available or to remove one CD and insert another at the appropriate time. While possible, such arrangements are at the very least inconvenient. In addition, because of the delays inherent in switching from one CD to another, the audio or video output might be lost for an undesirably long period of time thereby detracting from the ambiance afforded by the performance. In addition, listeners at times are only interested in one or two of the tracks on a CD in a given situation.

There thus continues to be a need for systems and methods which will make it possible to combine works by a variety of performers or artists in a relatively arbitrary fashion and to present those works in a given sequence in a fashion that is convenient but which at the same time is cost effective. It would also be desirable to be able to use widely available personal computers as control elements in such systems.

SUMMARY OF THE INVENTION

A system and a method of arranging media elements for later replay make it possible to create new sequential presentations of the elements. The elements can be obtained from a local medium such as a CD, or a video tape. Alternately, the elements can be obtained from a remote location via wired or wireless transmission. Elements can include audio works such as music or audio/visual works including advertisements, music videos or other types of elements.

The elements can be stored on a readable digital storage medium. Some or all of the elements can be played back or performed individually.

A collection of separate elements can be identified and arranged. One form of arrangement is a list. Another is a non-linear tree-like arrangement.

The collection can be played back or performed sequentially as specified in a list. Alternately, the elements can be performed interactively as specified in a tree. In this embodiment, tree nodes represent decision points for a viewer or a listener.

A graphically-oriented editor is provided for building or editing lists or trees. The lists or trees can be stored and subsequently retrieved for editing or performing the collected media elements.

Output can, in one aspect, be an audible or a visible performance of the elements in accordance with a selected list or tree. In another aspect, the collection can be written to a medium. Hence, a CD or other digital medium can be written, or audio or video tapes can be recorded. The output medium is not a limitation of the invention.

In yet another aspect, a system incorporating a card reader or a vending unit can be used to build a list of elements. In this instance an appropriate credit needs to be established before an element can be added to an on-going collection being performed.

Subsequent to a credit being established and a selection or selections made in accordance with the credit, elements can be added to the list and performed. Elements can be exclusively audio. Alternately, elements can include both audio and video components without limitation.

In yet another aspect, the method includes building a list of media elements which can come from a variety of sources. Preferably, the media elements are storable in a digital format.

Subsequently, the list can be reviewed visually by a user and either modified or edited for the purpose of creating a sequence of media elements to be replayed or presented. Subsequently, the list is executed and the elements are either presented audibly or visually or both in accordance with their characteristics.

In a further aspect, a digitized inventory of media elements can be created by either reading a local digital medium, such as a CD ROM or by receiving, via wireless transmission, digitized sequence of works which can then be stored in the inventory. If desired, the user can preview some or all of any element in the inventory.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 4A through 4K illustrate various screens presentable by the control program illustrated in FIGS. 3A through 3P;

FIG. 7 is a diagram illustrating a system for presenting works on demand from either a local or a remote source.

DETAILED DESCRIPTION OF THE PREFERRED EMBODIMENTS

Figure 1:
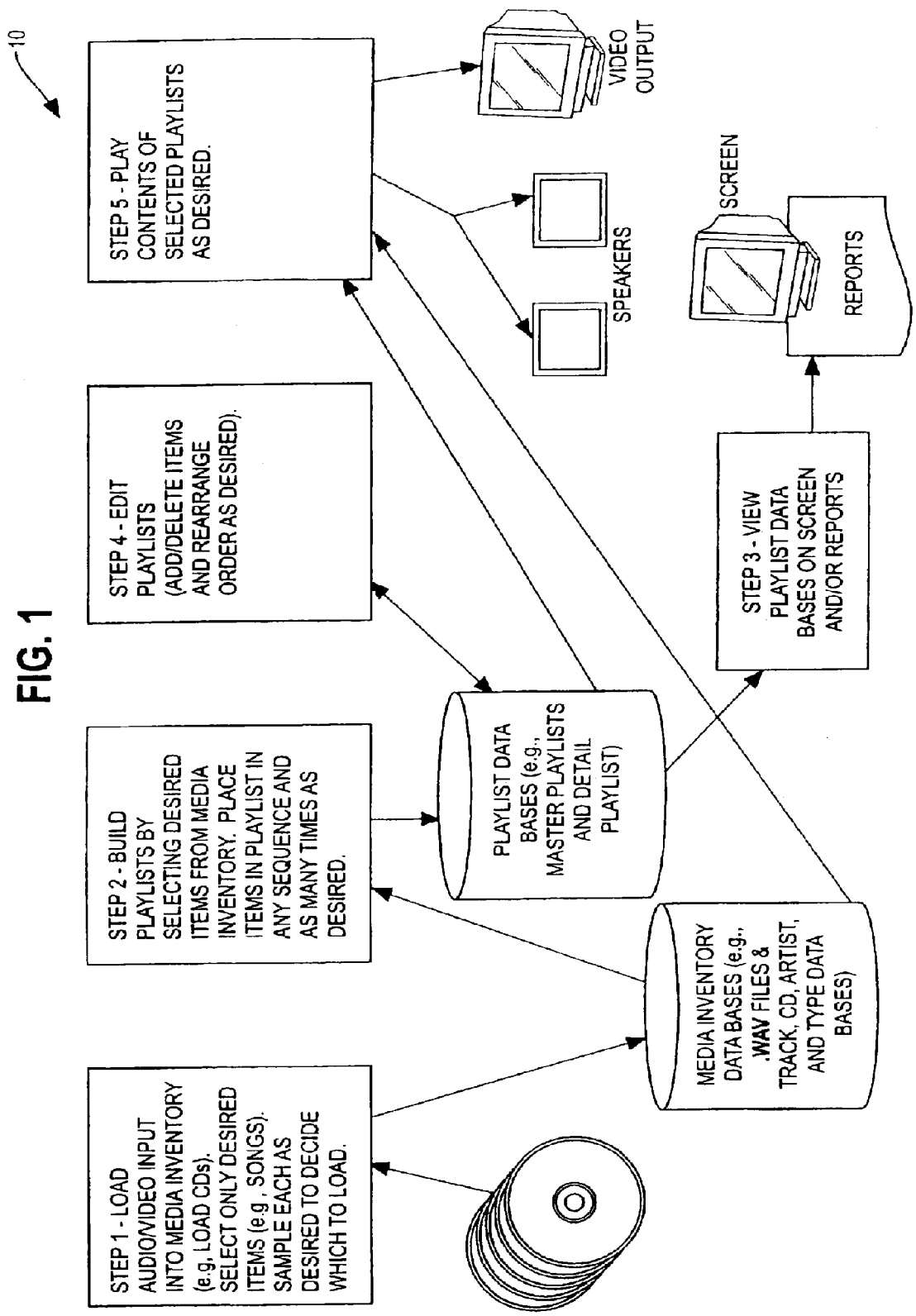
FIG. 1 is an overall flow diagram of a method in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the present invention enable the user to acquire, for example, digitized audio or audio and video works, which are of interest and which are to be represented either in real time as an audio or an audio/visual work or to be written onto a digital storage medium as part of a sequence selected by the user. Functional capability is provided enabling the user to create one or more composite play or presentation lists which incorporate a plurality of titles or designations of the works in a user selected order. The works could come from a variety of different sources and could include other types of sensory outputs without limitation.

As part of the list preparation process, the user can listen to or view some or all of any of the works. A new list can be graphically created. An existing list can be edited to revise existing works identified in the list, change the order of presentation or to add new ones. Subsequently, the list can be executed and the works performed.

Execution of the list will present the works in the determined sequential order audibly or visually and audibly depending on the nature of the work. Alternately, the works represented on the list can be written to a digital storage medium, such as a CD or DVD for subsequent presentation.

FIG. 1 illustrates steps of a method 10 for preparing executable playlists in accordance with one aspect of the invention. In an initial step, selected audio or video elements can be loaded into a digital database, a media inventory, for review and subsequent presentation. Media elements can be obtained from locally played sources or by wireless signals received from a remote source, such as via an antenna, which are demodulated and stored in digital form in the media inventory.

In the next step, a plurality of playlists can be created by graphically selecting media elements to be entered into a selected list from the inventory. As part of the step, one or more playlist records can be built and stored.

In a subsequent step, the lists in the playlist database can be viewed and various reports concerning the subject list can be created.

In a subsequent step, one or more of the lists can be graphically edited thereupon rearranging items in a list, adding items or deleting items as desired.

Finally, a particular list can be selected and executed. Audio works are presented sequentially, in accordance with the selected list, via audio output transducers, typically speakers. Video works or audio/video works are presented in accordance with the selected list on a video display in combination with speakers.

If desired, a selected list or lists can be written to a storage medium such as a CD ROM for later use. If desired, the associated media elements can also be written on to the medium.

A variety of services can be provided to a user while carrying out the steps of the method 10. Analysis can be conducted of the characteristics of various works. For example, beats per minute can be determined and audio works can be sorted accordingly. A list or lists can be created in accordance with a pre-selected tempo or beats per minute.

Sorting or selecting based on other features of audio or video characteristics of the works can also be included. Presentations via a selected list can be controlled based on selected features.

For record keeping purposes, the number of times a given media element is presented or executed can be logged along with date and time information. Reports reflecting any lists created based on any of the above selection features or characteristics can also be printed for invoicing, billing or royalty payment purposes.

Figure 2:
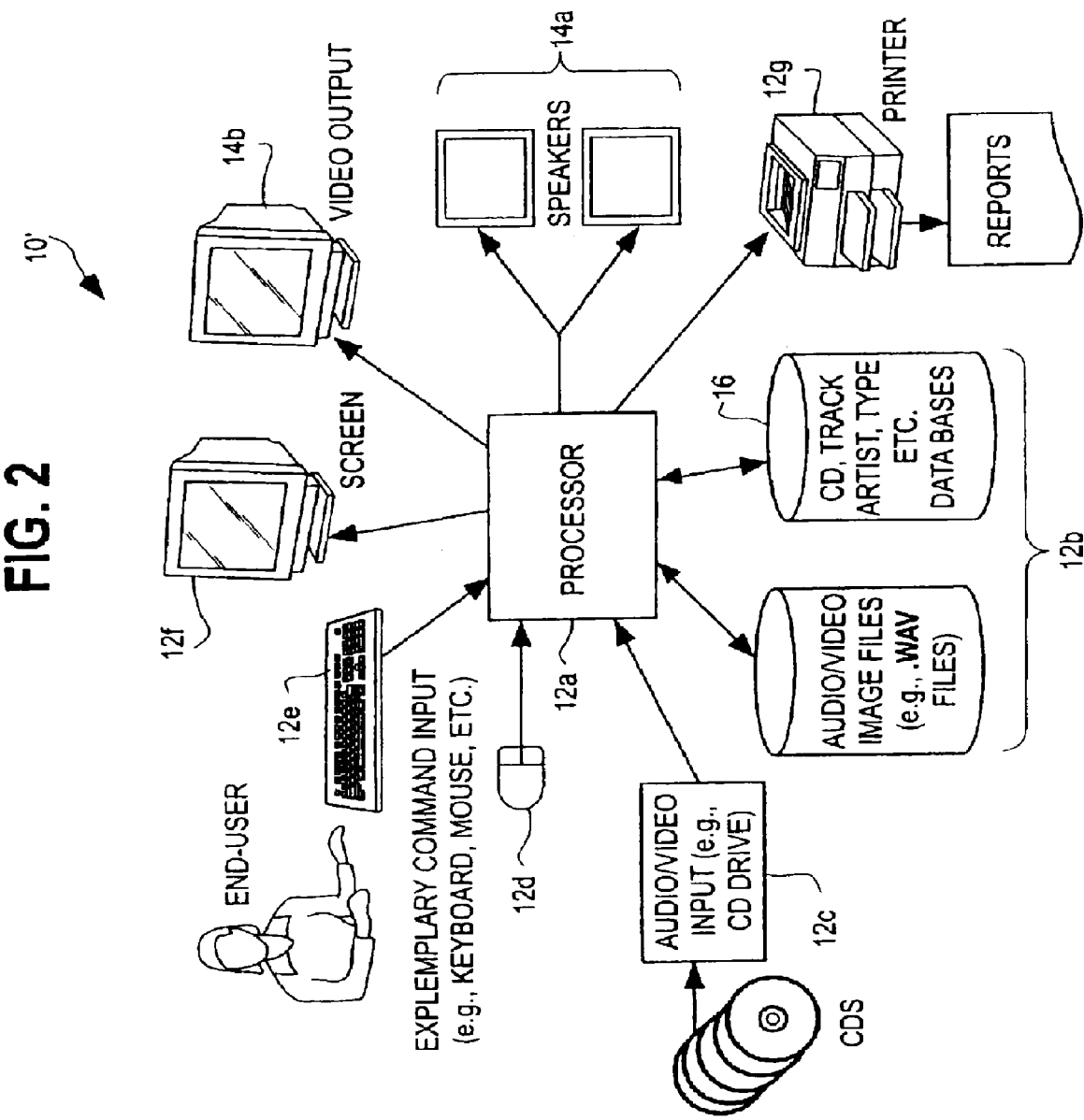
FIG. 2 is a block diagram of a system useable for practicing the method of FIG. 1.

FIG. 2 illustrates in block diagram form a system 10' for implementing the method 10 of FIG. 1. The system 10' incorporates a programmable processor 12a, for example, a personal computer of a selected variety. Coupled to the processor 12a is a mass digital storage medium 12b, such as a hard disk drive for storage of various databases and programs.

Coupled to the processor 12a is a source of digitized audio or audio/visual input signals such as a CD ROM drive 12c. Media elements or works can also be received wirelessly. Also coupled to the processor 12a are user input devices such as a mouse 12d and a keyboard 12e. Other input devices could also be used without limitation.

Output devices include a display screen 12f of a type conventionally used with programmable processors to present visual display of ongoing programs being executed to the user. A printer 12g is available to provide reports.

Audio and video output devices for media elements include speakers 14a and video output device 14b which can be of a size and quality suitable for the type of works being displayed. Other output devices could also be used.

The hardware components of the system 10' interact in accordance with the user inputs and under the control of a control program 16 stored in one of the storage devices 12b. The control program 16 includes pre-created commands for carrying out the method 10 illustrated in FIG. 1.

Figure 3A:
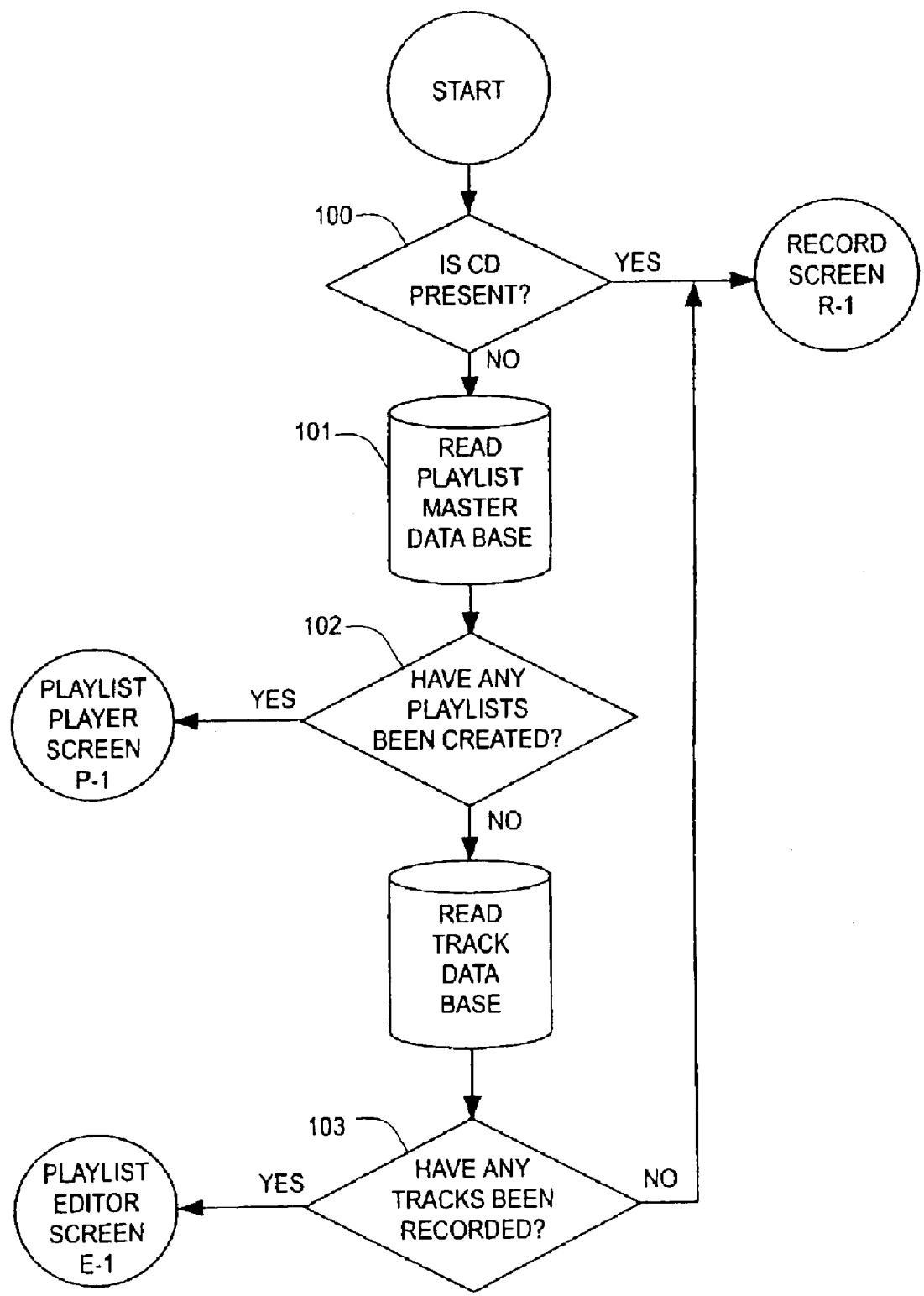
FIGS. 3A through 3P taken together illustrate a flow diagram of a control program useable with the system of FIG. 2.

The control program 16 is described in a set of flow diagrams illustrated in FIGS. 3A . . . 3M. FIGS. 4A-4K illustrate various exemplary displays presented on the display unit 12f while the control program 16 is executing.

Figure 3B:
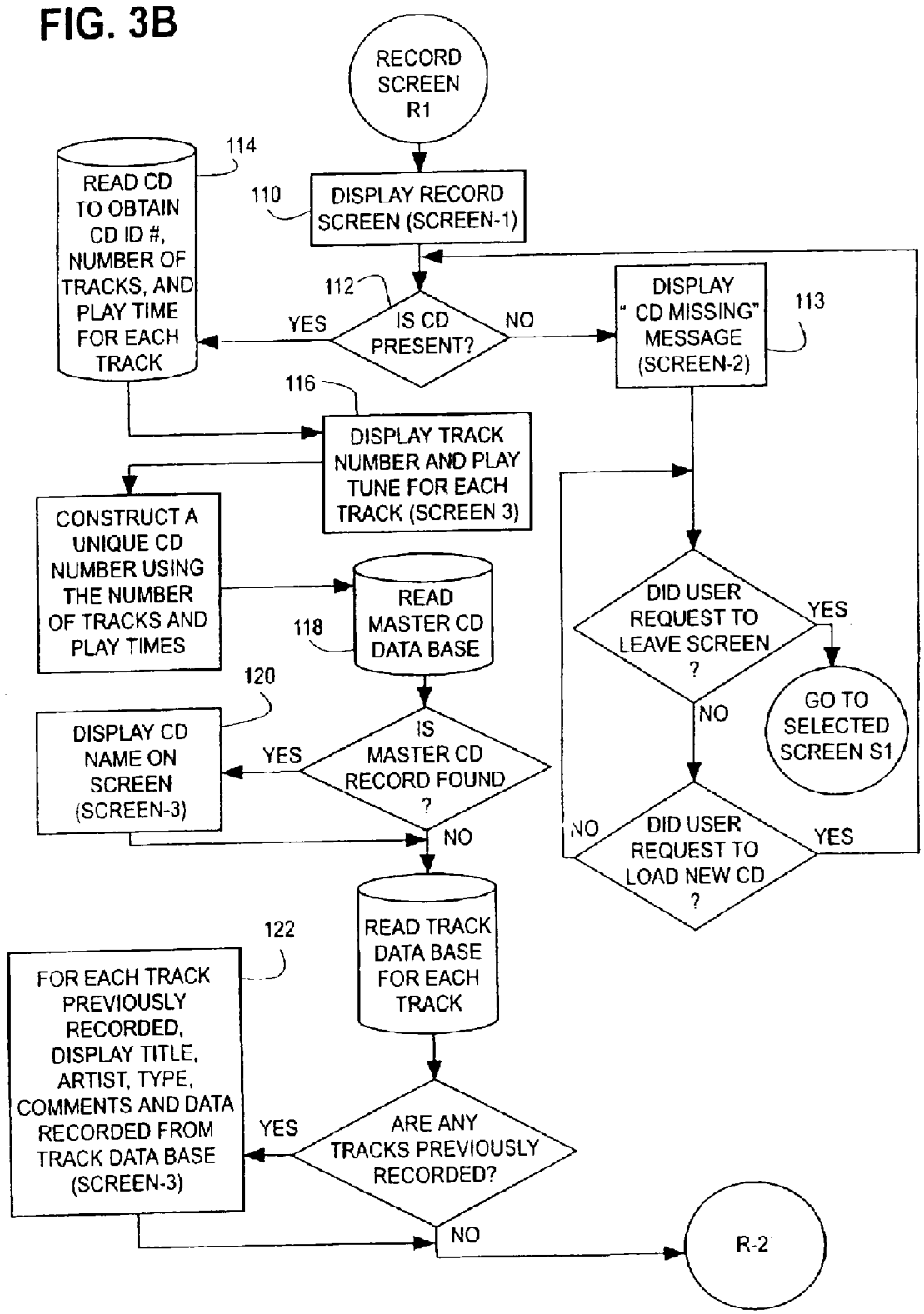
Figure 3C:
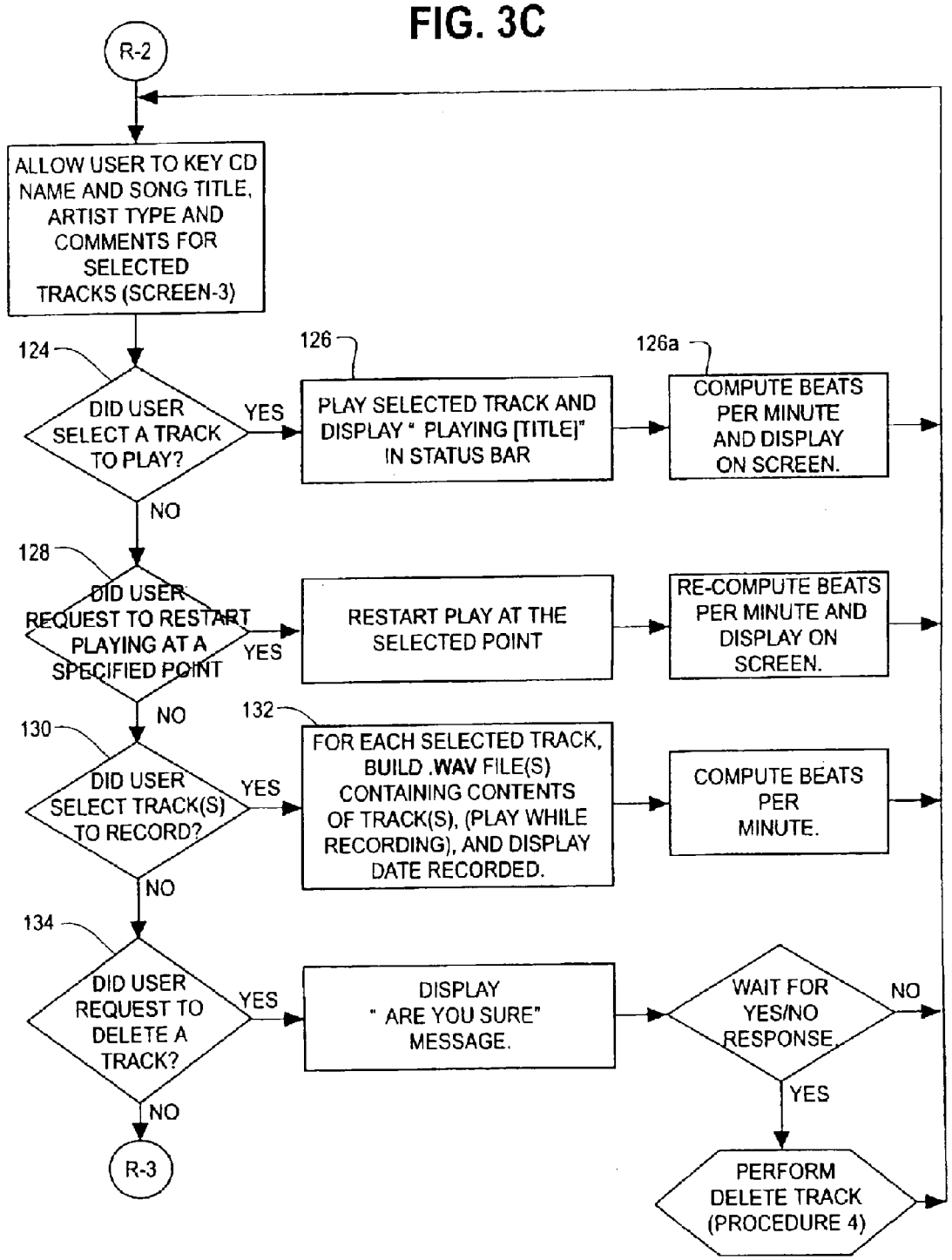
Figure 3D:
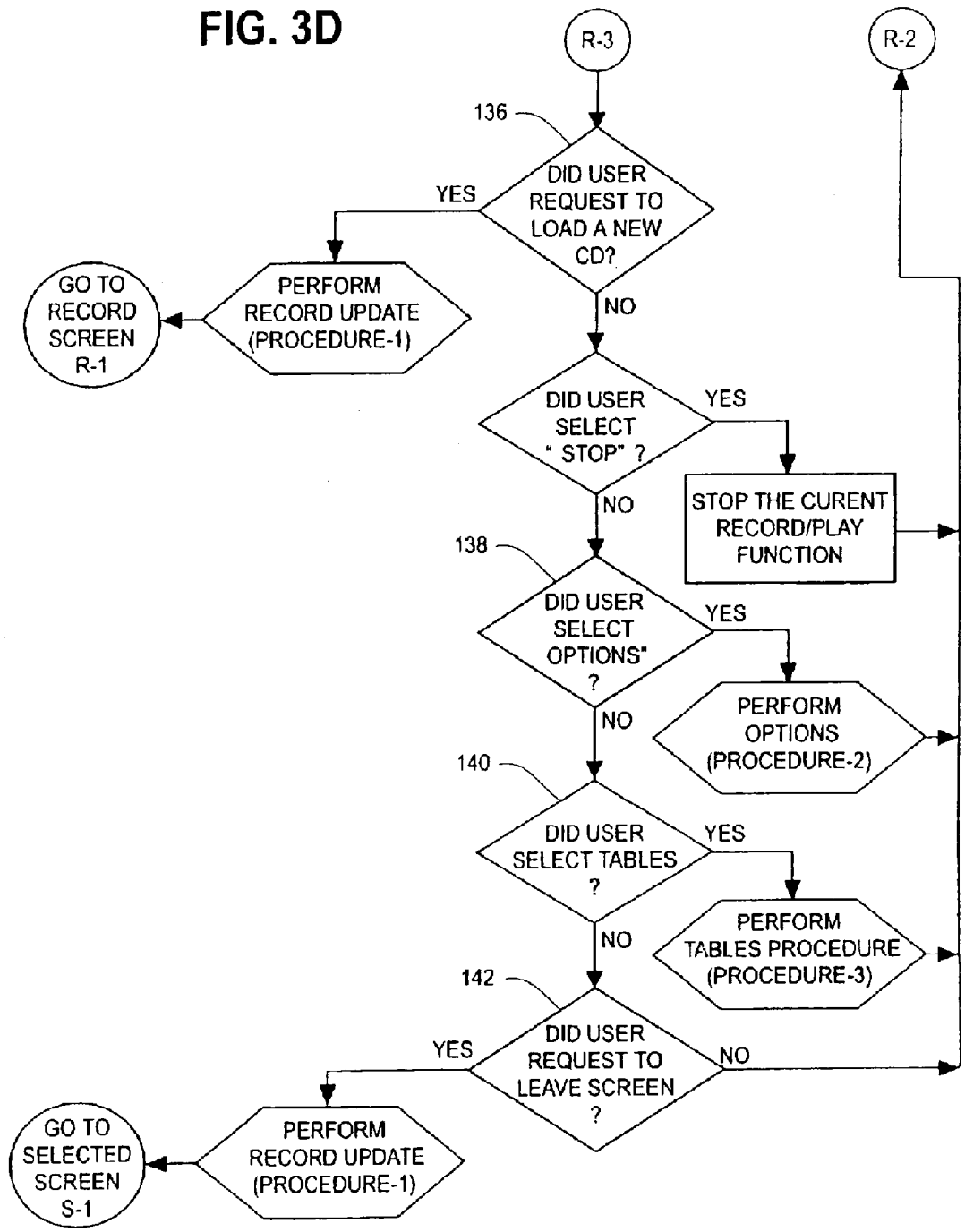
Figure 3E:
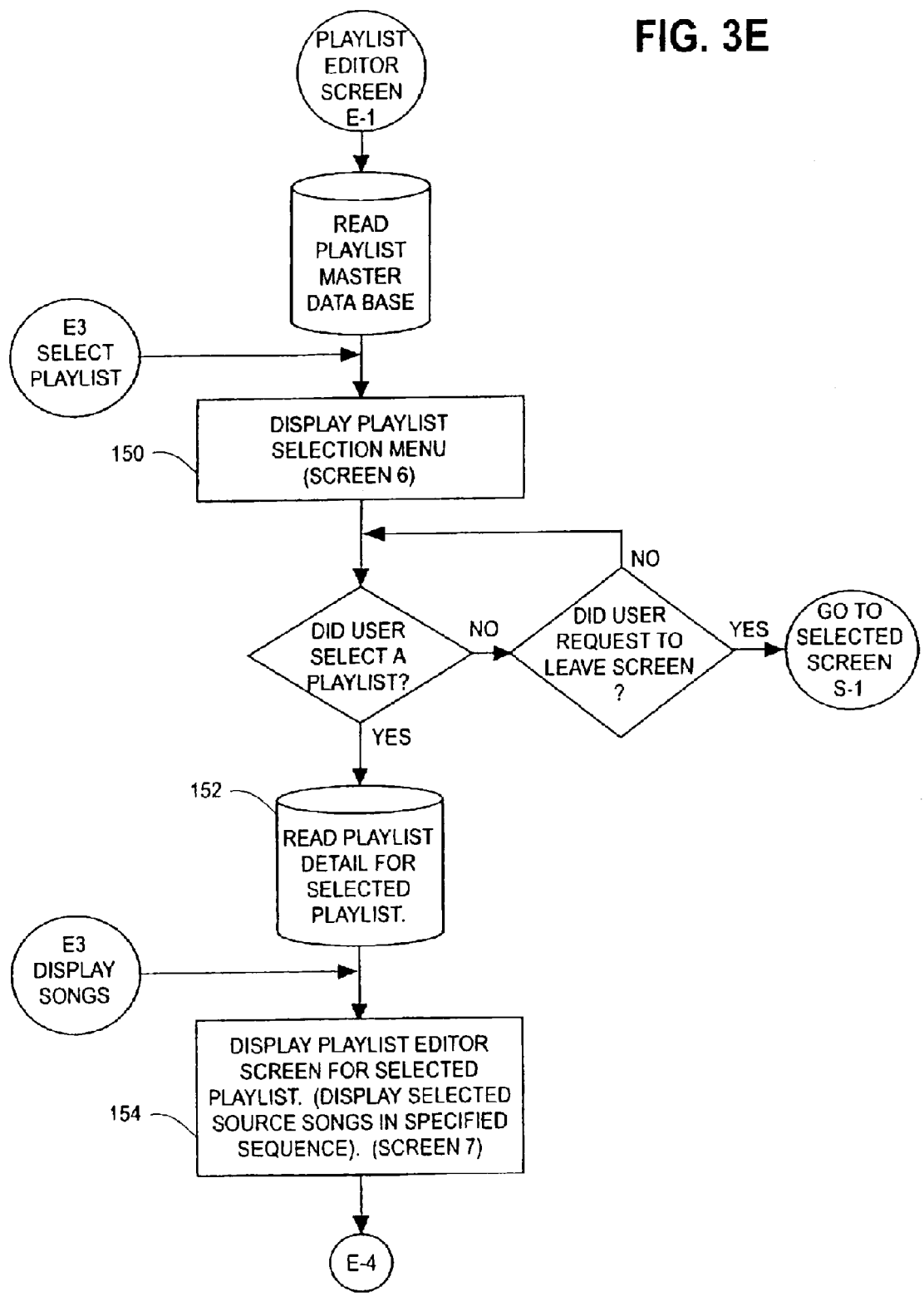
Figure 3F:
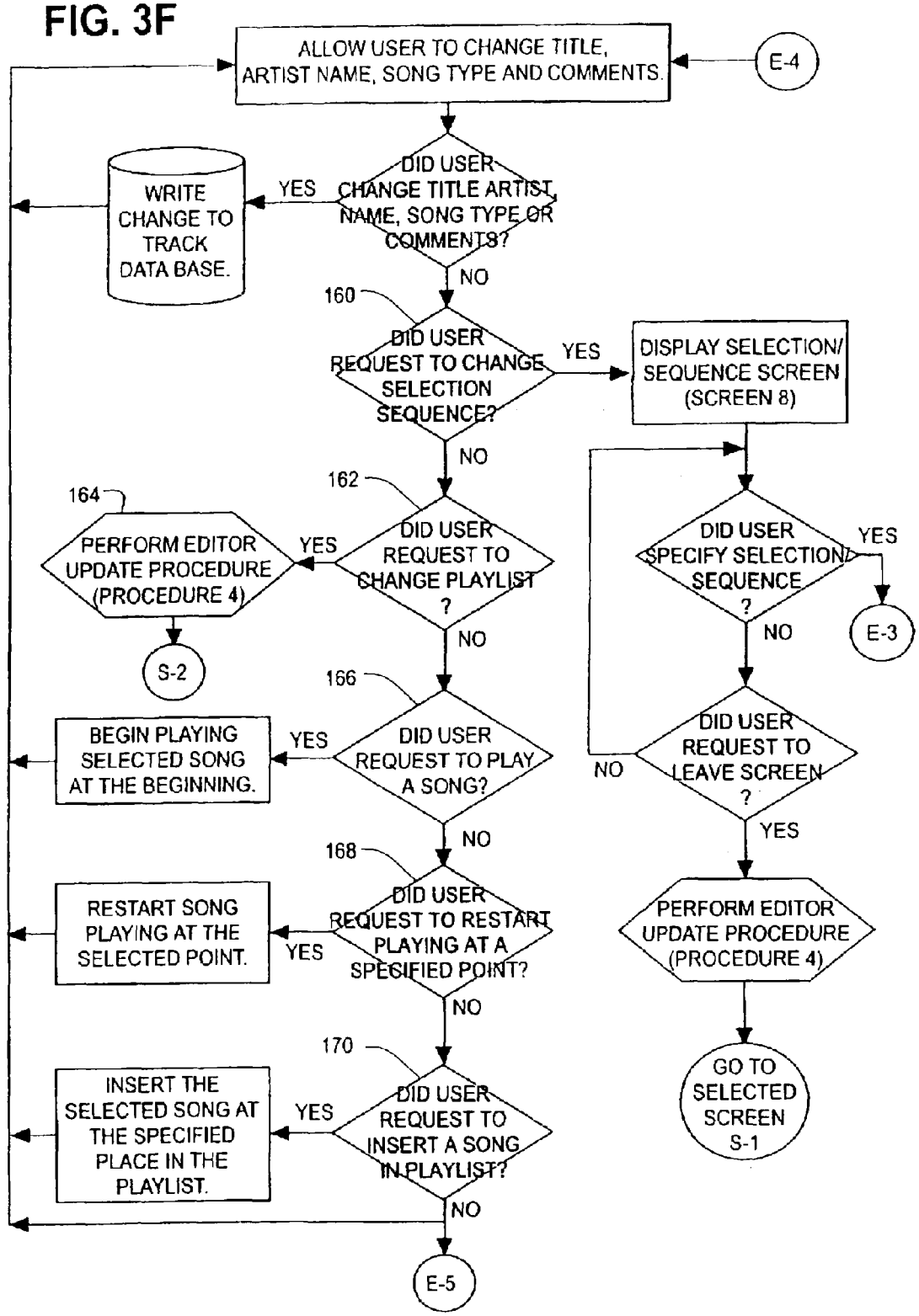
Figure 3G:
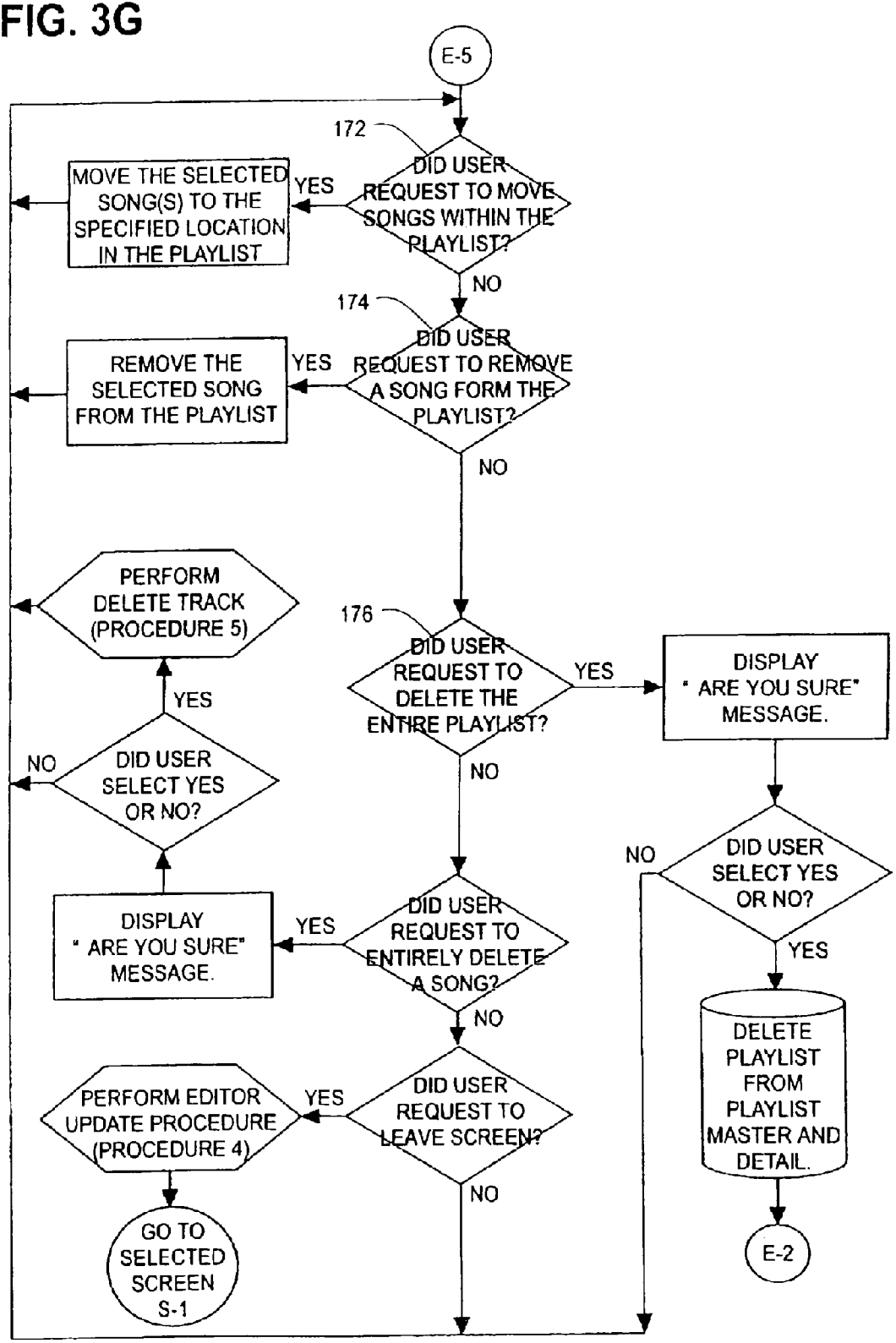
Figure 3H:
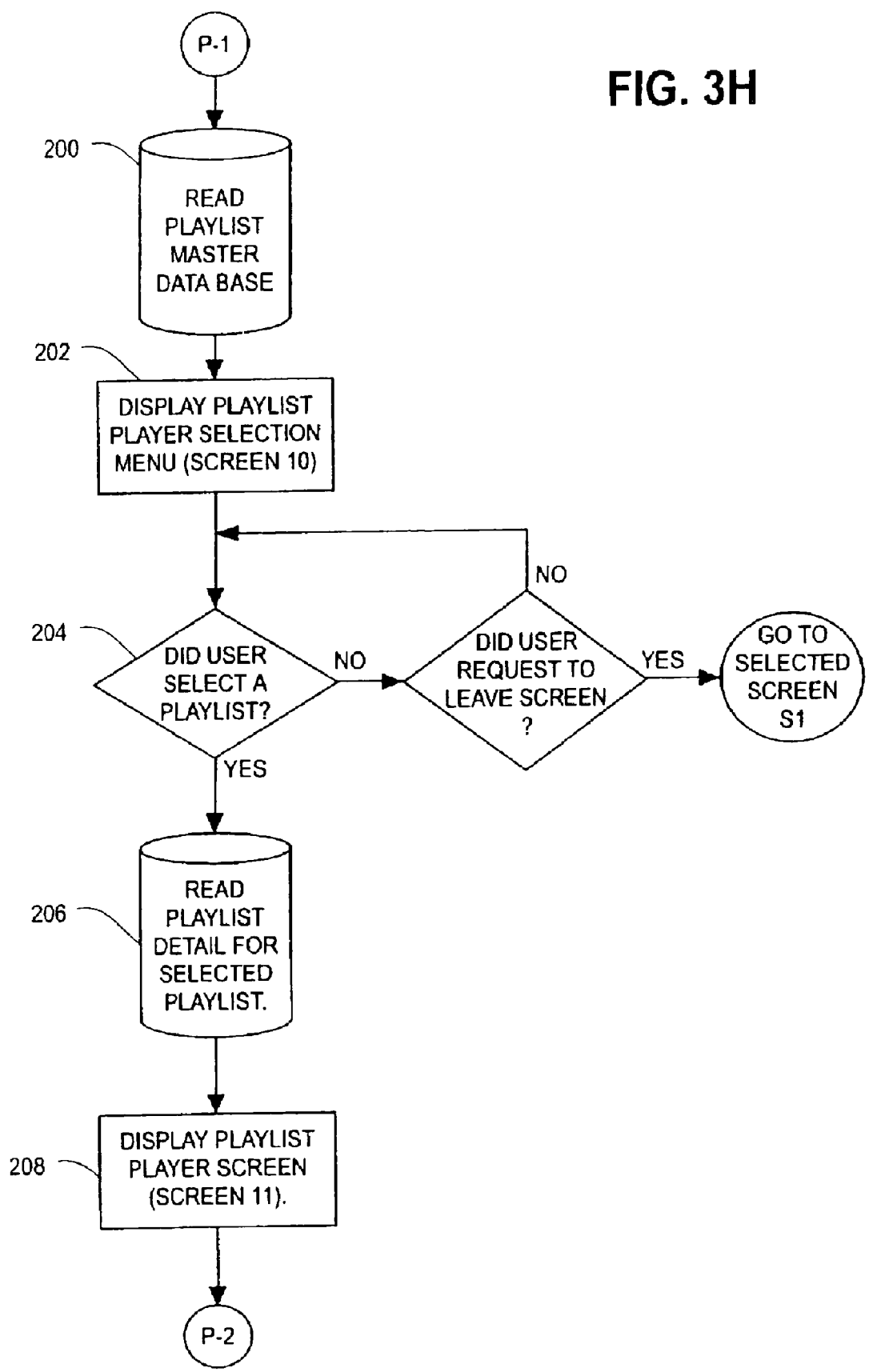

FIG. 3A illustrates the initial steps in reading a source of digitized works, such as a CD and in selecting either the record sequence, FIGS. 3B, 3C, and 3D, the list player sequence FIGS. 3H and 3I, or the playlist editor sequence FIGS. 3E, 3F and 3G. In step 100 a determination is made if a CD is present in the drive 12c. If so, the program 16 initiates record steps illustrated in FIGS. 3B, 3C and 3D. If not, the playlist master database is checked in a step 101. If playlists had previously been created, the playlist screen sequence is executed, FIGS. 3H and 3I in step 102. Alternately the editor sequence can be entered, FIGS. 3E, 3F and 3G in step 103.

Figure 4A:
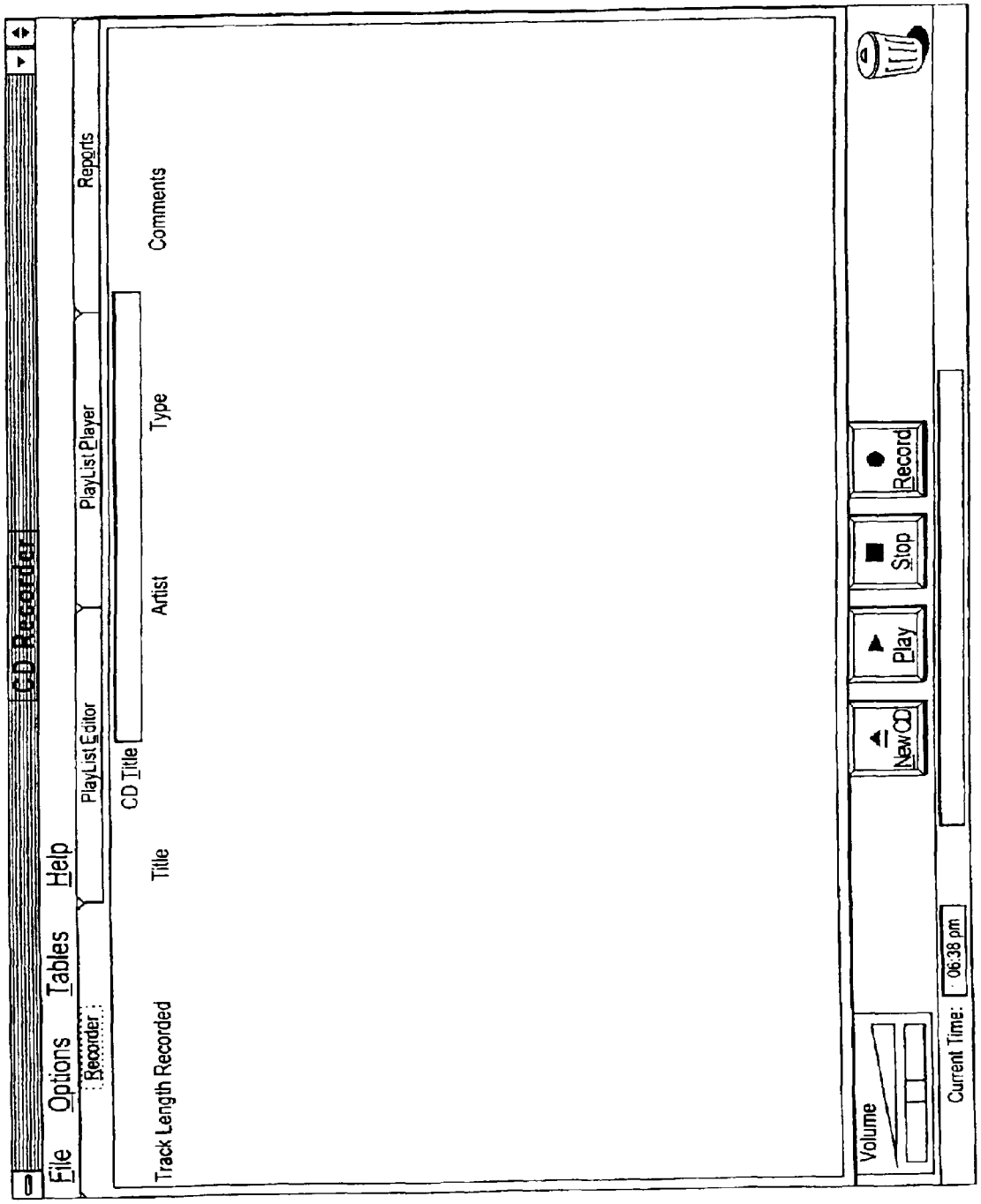
Figure 4B:
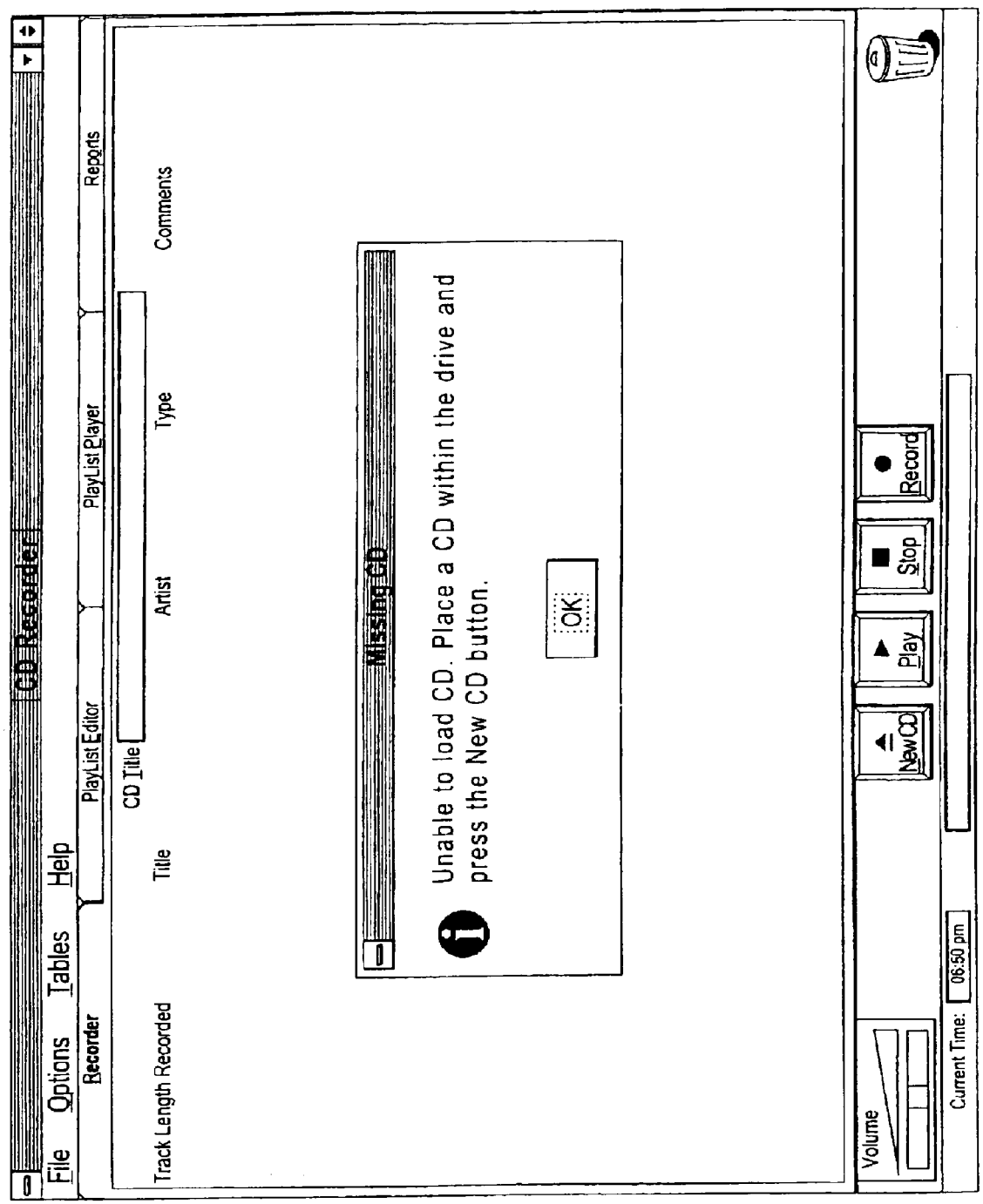

With respect to the record sequence FIG. 3B, during the process of recording information off of the respective CD, in a step 110 an initial screen, FIG. 4A is displayed. If the processor 12a determines in a step 112 that a CD is not present, then a CD missing display, FIG. 4B is presented in a step 113.

Figure 4C:
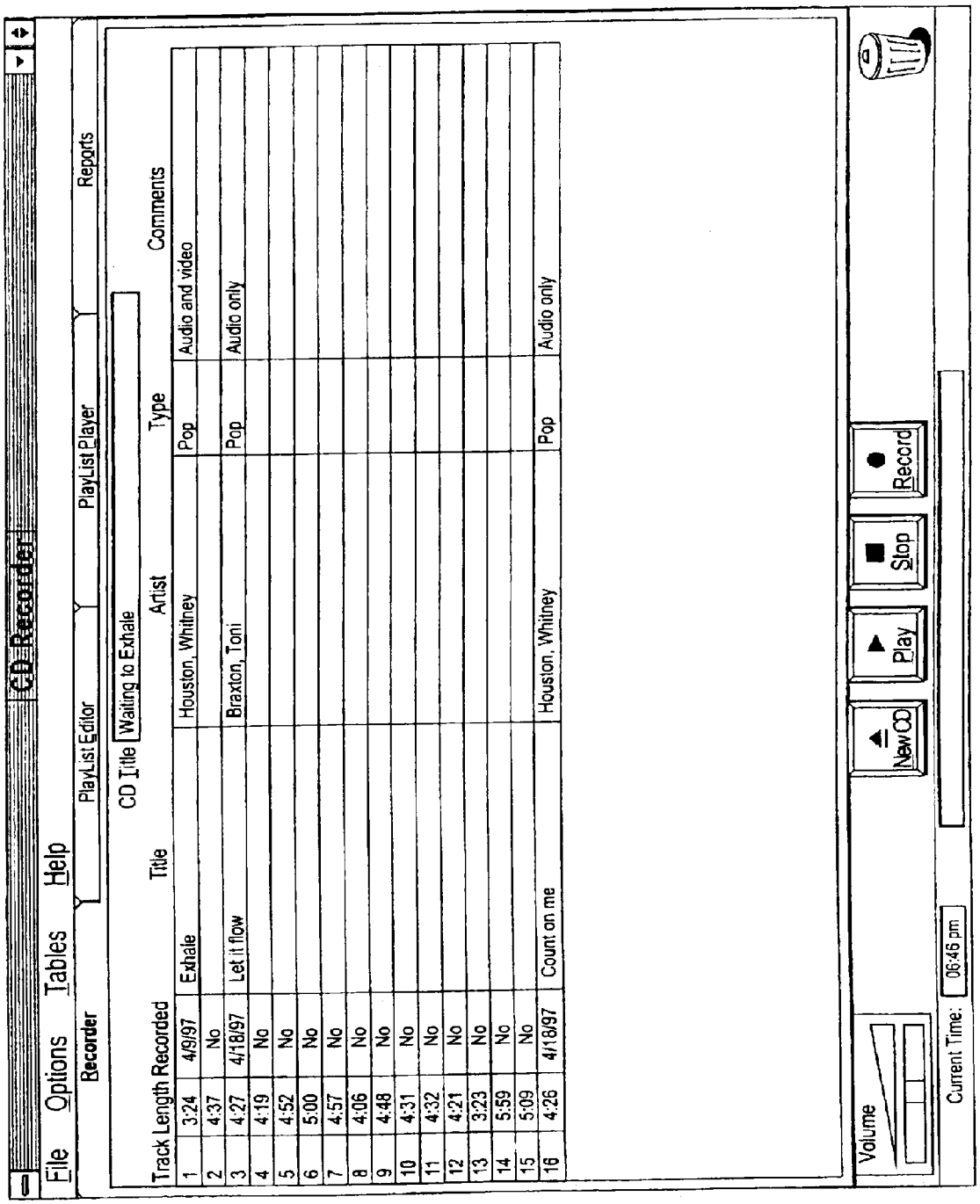
Figure 4D:
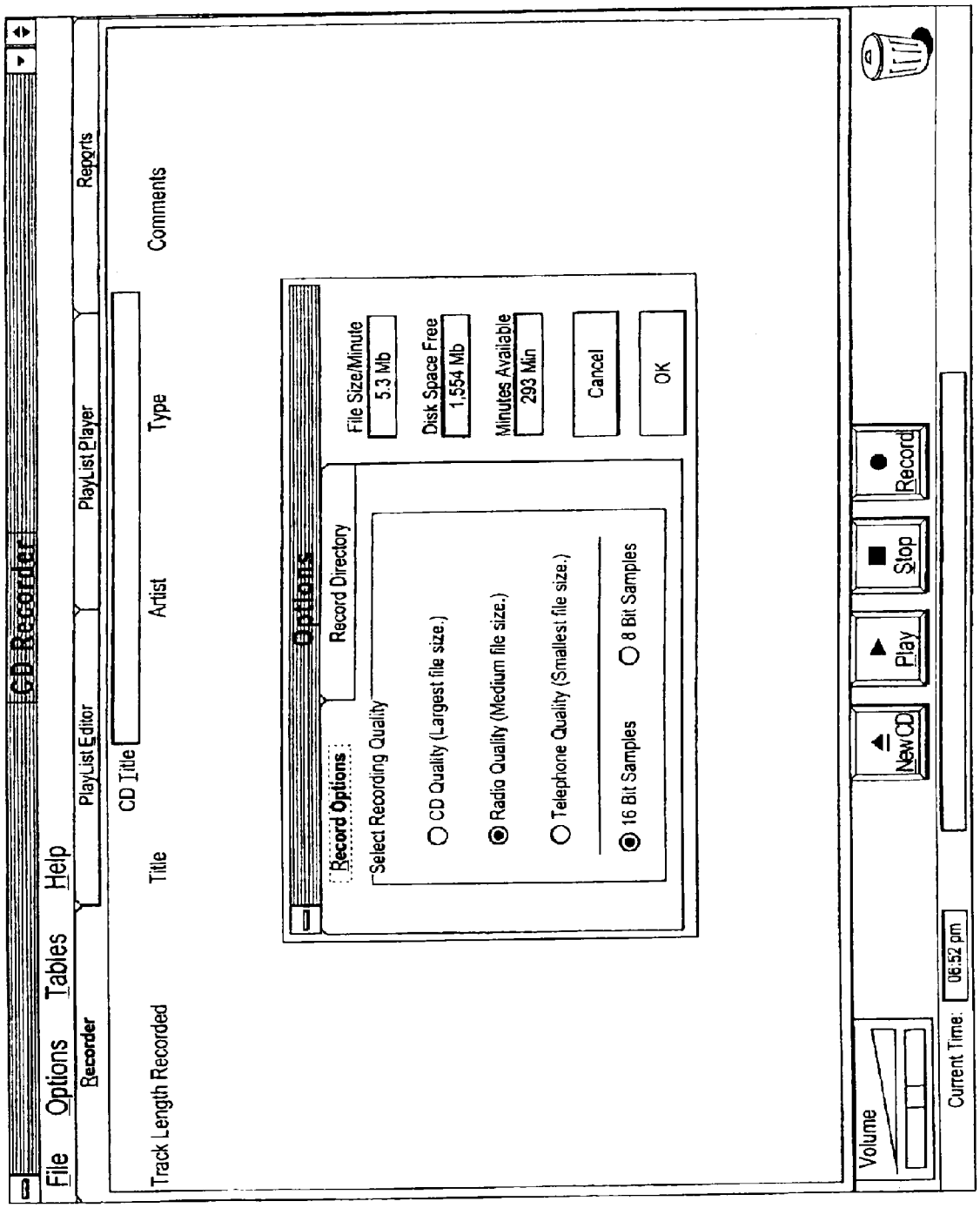
Figure 4E:
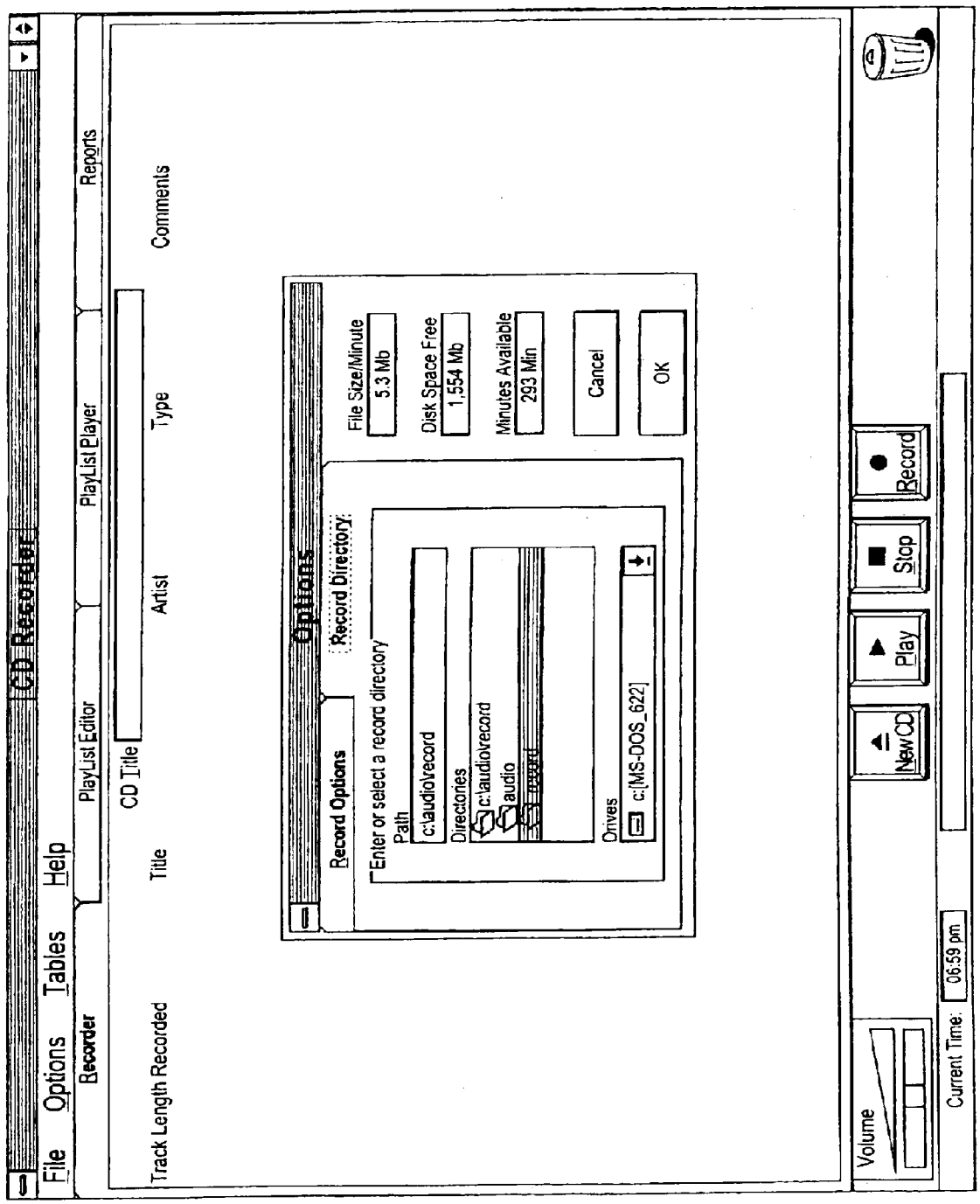
Figure 4F:
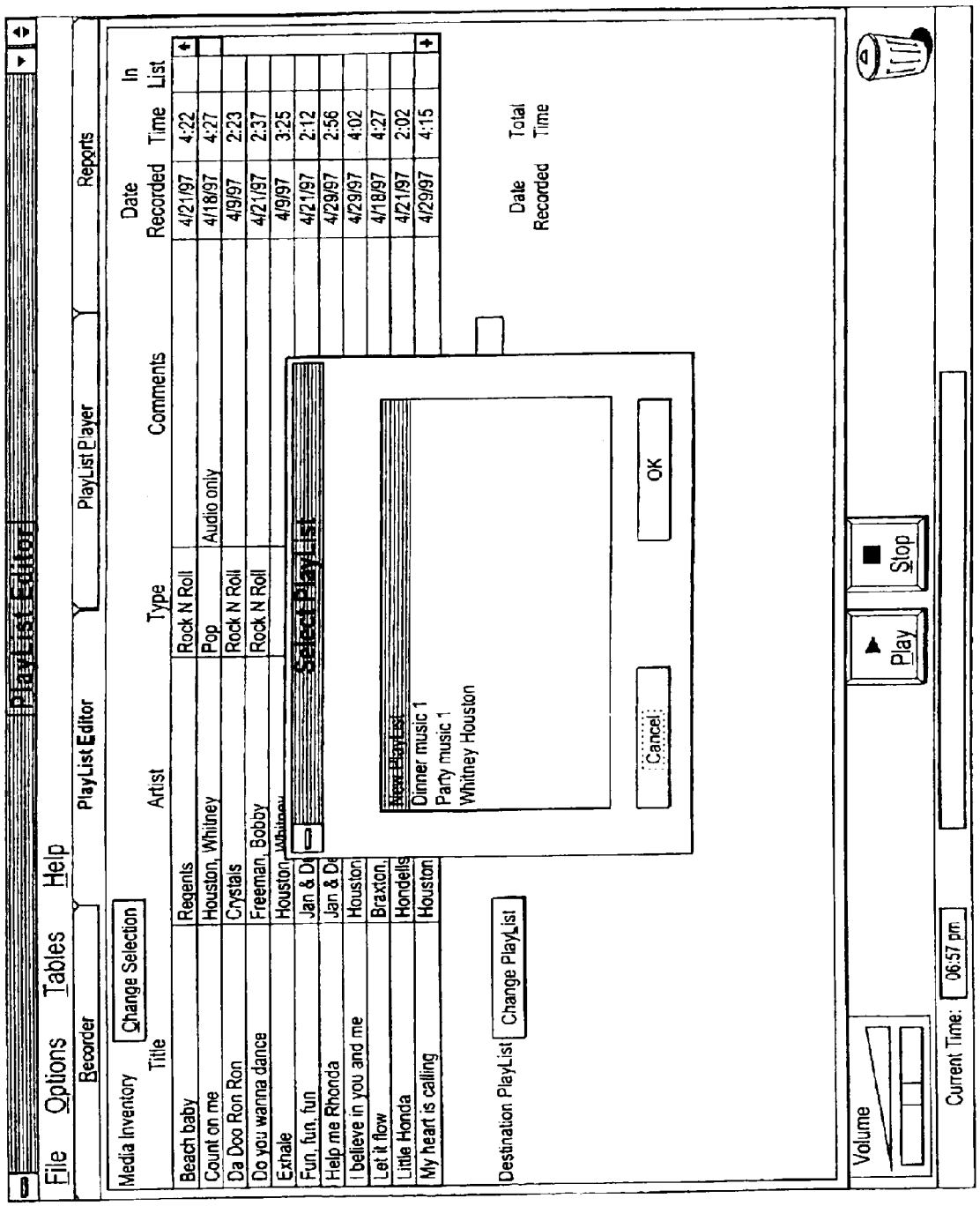

In the event that a CD is present, in a step 114, information will be read off of it as to track numbers and play times and displayed in a step 116 as in FIG. 4C. In a step 118, the master CD database is checked and if a corresponding record is found, in a step 120 the name of the CD is displayed, as indicated in FIG. 4C. Where tracks off of the respective CD had been previously recorded, in step 122, that information will be retrieved from the track database and displayed also as illustrated in FIG. 4C. The length of each track, recording date, title artist and type of work all can be displayed.

With respect to FIGS. 3C and 3D, in a step 124 the control program 16 determines whether or not the user has selected a track to play. If so, the selected track is played in a step 126. If desired, as illustrated in a step 126a characteristics of the work such as beats per minute can be computed and displayed for the user.

In a step 128, the control program 16 checks to determine whether or not the user requested restart of a work at a specified point. If not the system determines in a step 130 if the user has selected one or more tracks to be recorded. If so, in a step 132, selected tracks are recorded.

The system control program 16 also determines whether or not the user has requested a deletion in a step 134 or requested that a new CD be loaded in a step 136, select options in a step 138, a tables function in a step 140 or an exit function in a step 142. In each of steps 136, 138, 140 and 142, the requested respective procedure is carried out.

Where a user has selected the edit screen, illustrated in FIGS. 3E, 3F and 3G, one or more pre-existing playlists can be retrieved and edited. In a step 150, a playlist selection menu is displayable by the control program 16, in accordance with FIG. 4F. Using the selection menu a particular playlist can be selected and the detail retrieved in a step 152 for the selected playlist. The selected playlist can be displayed for editing as illustrated in FIG. 4G in a step 154. For the convenience of the user, the editor screen, FIG. 4G, illustrates in an upper section, an inventory list of available works currently in inventory which can be selected and entered into the destination playlist, in the lower portion of the display illustrated on FIG. 4G.

Figure 4H:
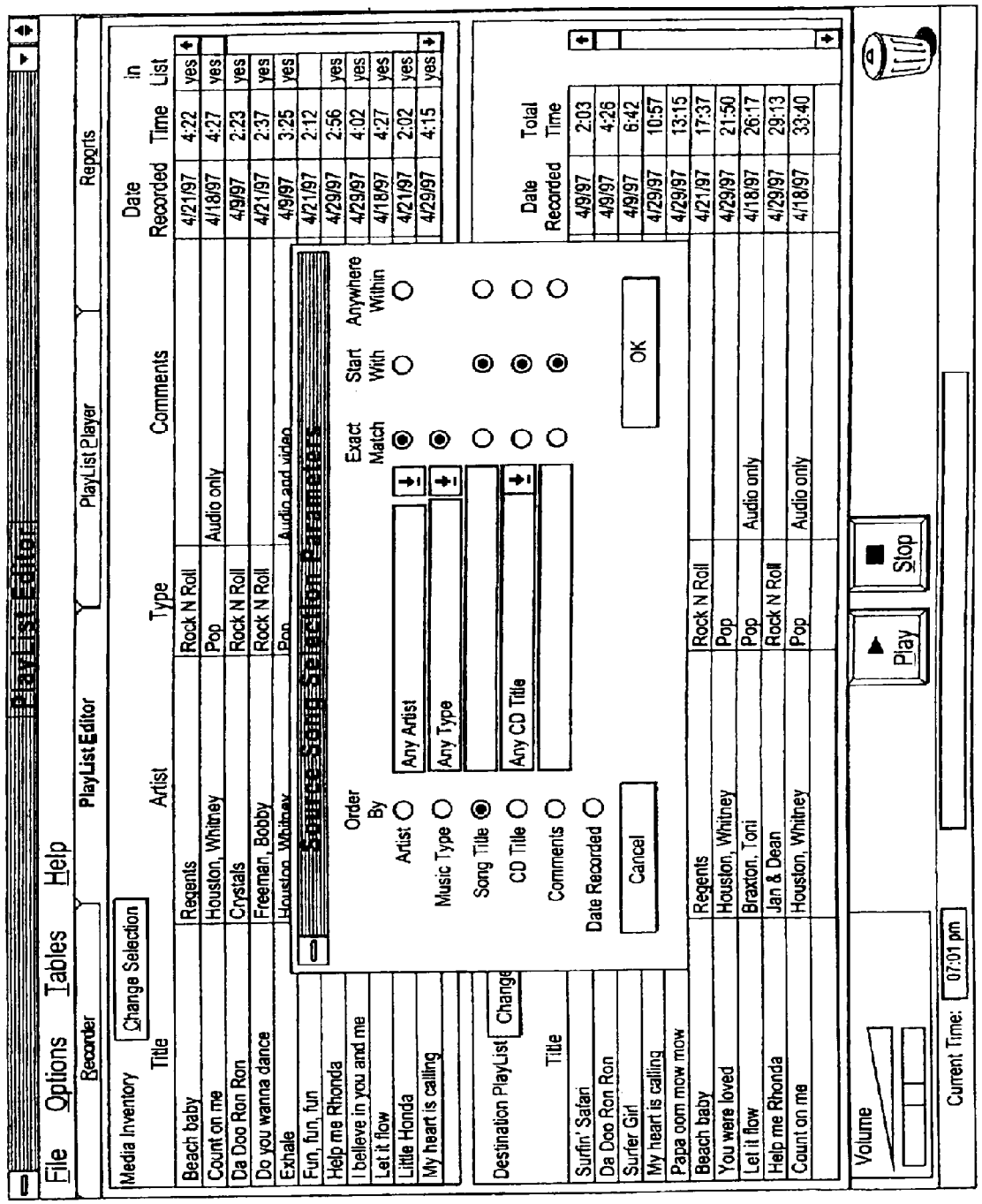

As illustrated in FIG. 3F, in a step 160, a user can edit or revise selections or the sequence of selections in the subject list using an editor selection screen as illustrated in FIG. 4H. In the event that the user requested a change in the play sequence in a step 162, an update procedure is executed in a step 164 corresponding to FIG. 3D and FIG. 4I. It will be understood that standard editing-type functions will be available to the user as would be known to those of skill in the art.

In a step 166 the user can request that a particular selected work be played or presented. The works can be restarted in a step 168 at a particular point.

The user can insert a work or a song in a playlist in a step 170. With respect to FIG. 3G, a work or song can be moved within the playlist in a step 172. A particular song or work can be removed from the selected playlist in a step 174. The entire playlist can be deleted in a step 176.

Figure 4J:
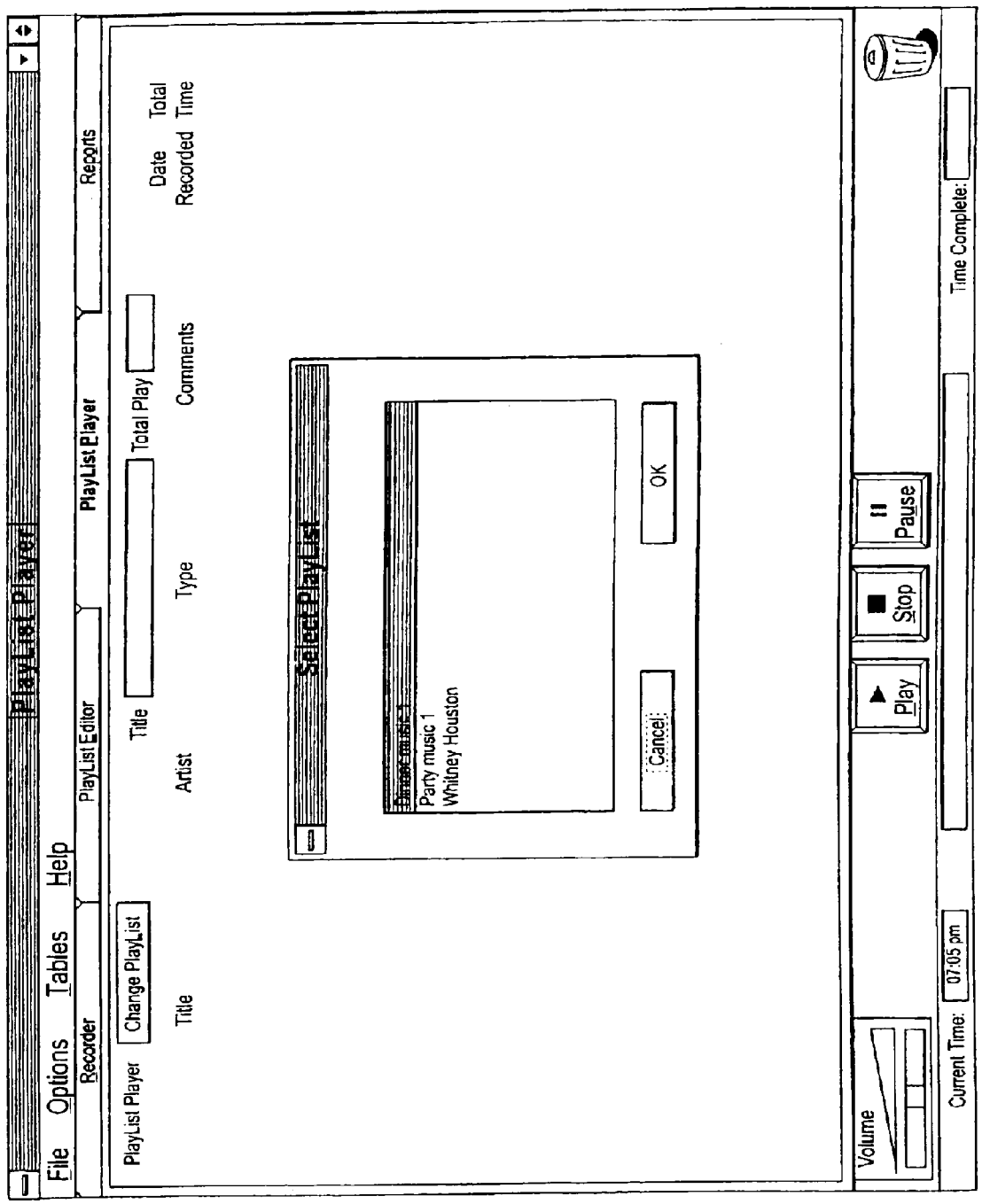
Figure 4K:
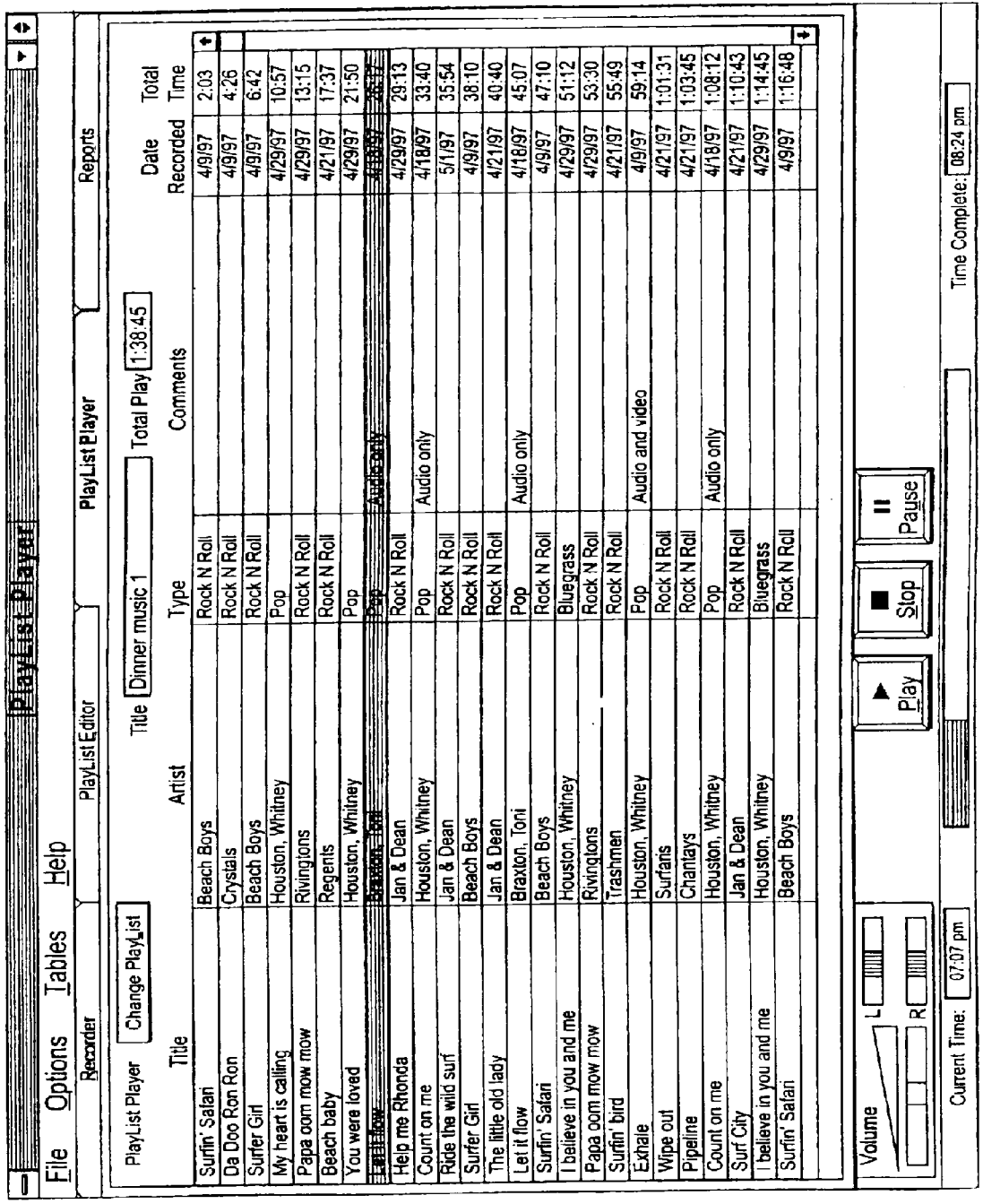

In the event that the user desires to select a particular playlist for execution, in a step 102, FIG. 3A, the playlist master database is read in a step 200, FIG. 3H. The playlist player selection menu FIG. 4J is displayed in a step 202. If the user selects a playlist in a step 204, the playlist detail is read from the appropriate database in a step 206. The selected playlist is then displayed, FIG. 4K, in a step 208.

With respect to FIG. 3I, the user can exit the player screen sequence or can request execution of the playlist in a step 210 at the beginning of the list or at a specified work or song. The list is then executed in a step 212.

Figure 3L:
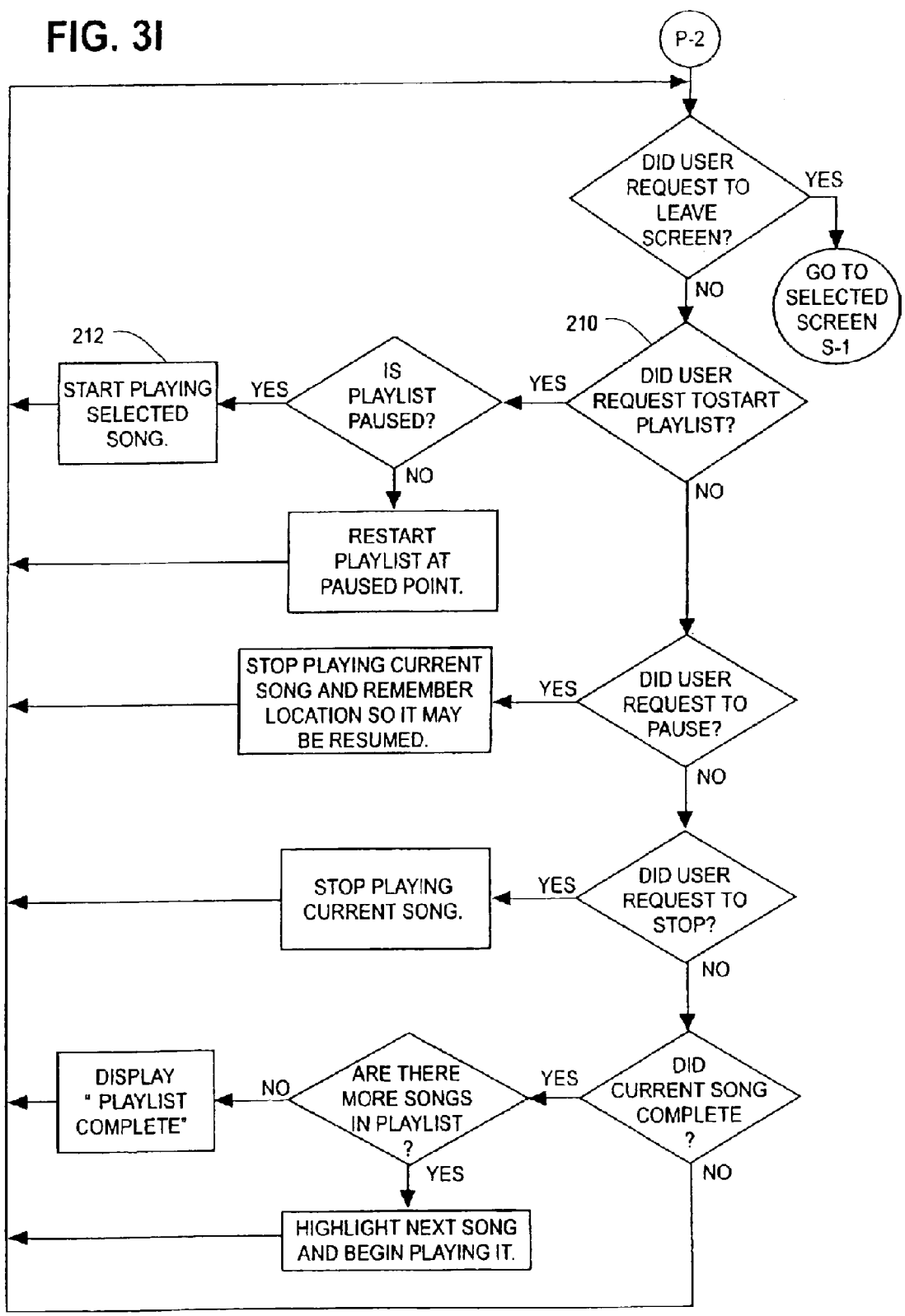
Figure 3J:
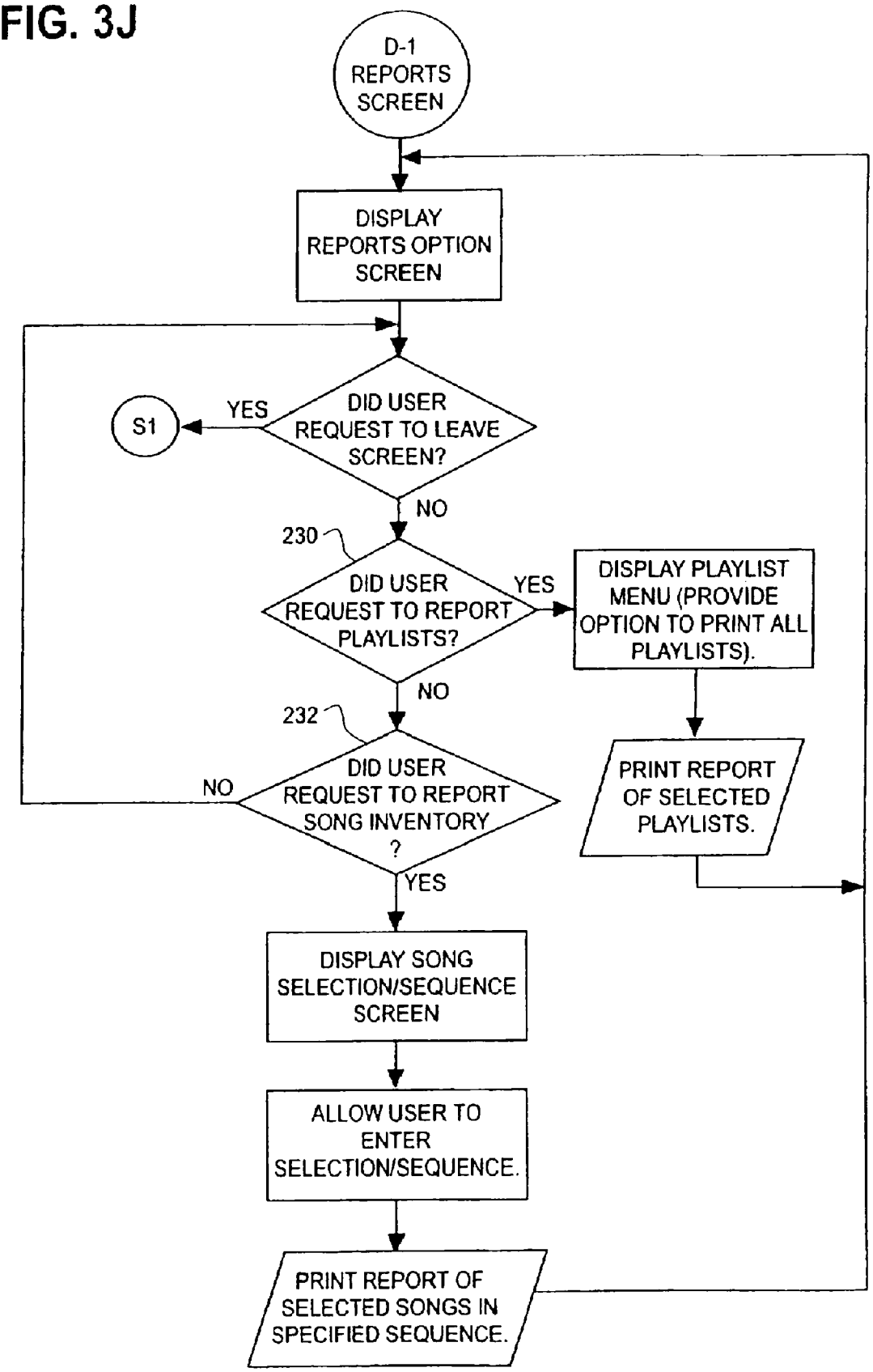

In the event that one or more reports are to be created using the printer 12g, the process of FIG. 3J can be used to request reports as to existing playlists in a step 230. Alternately, the user can request a report of the existing inventory of media elements in a step 232.

Figure 3K:
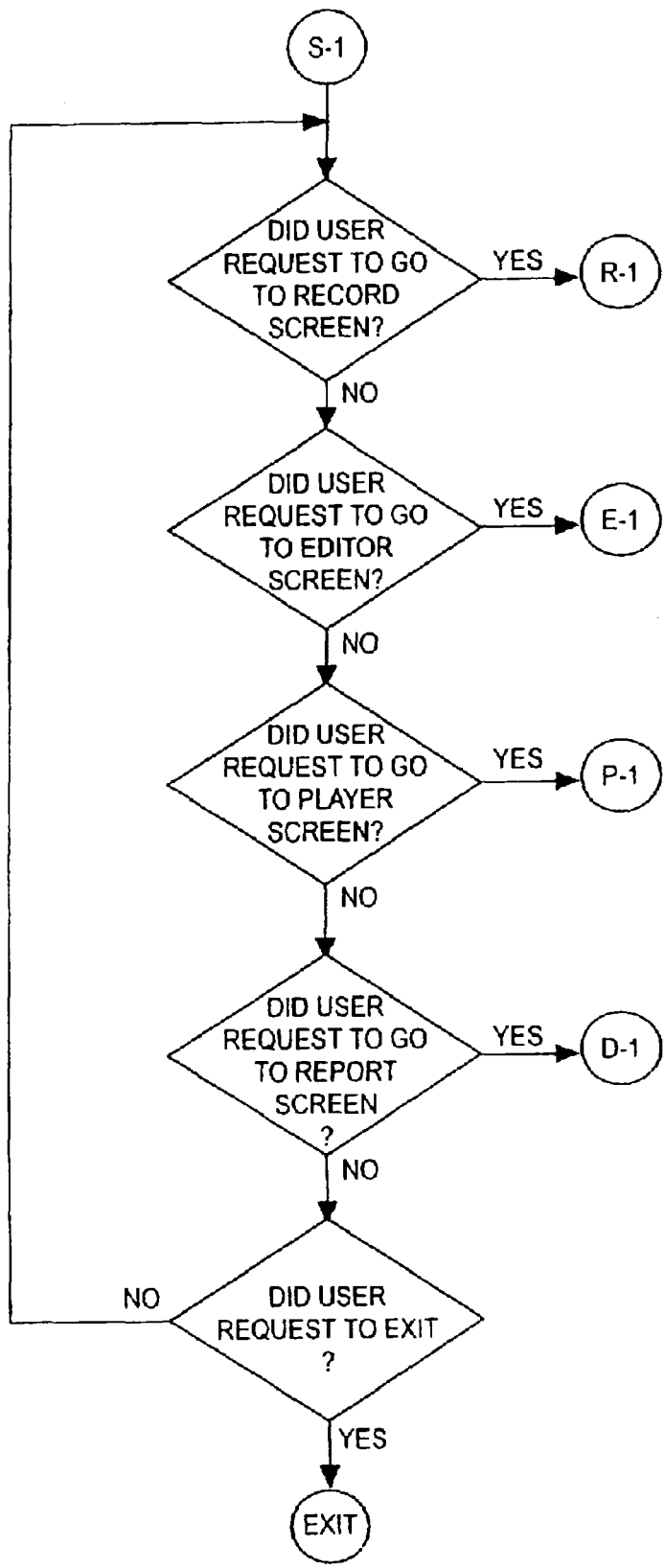
Figure 3L:
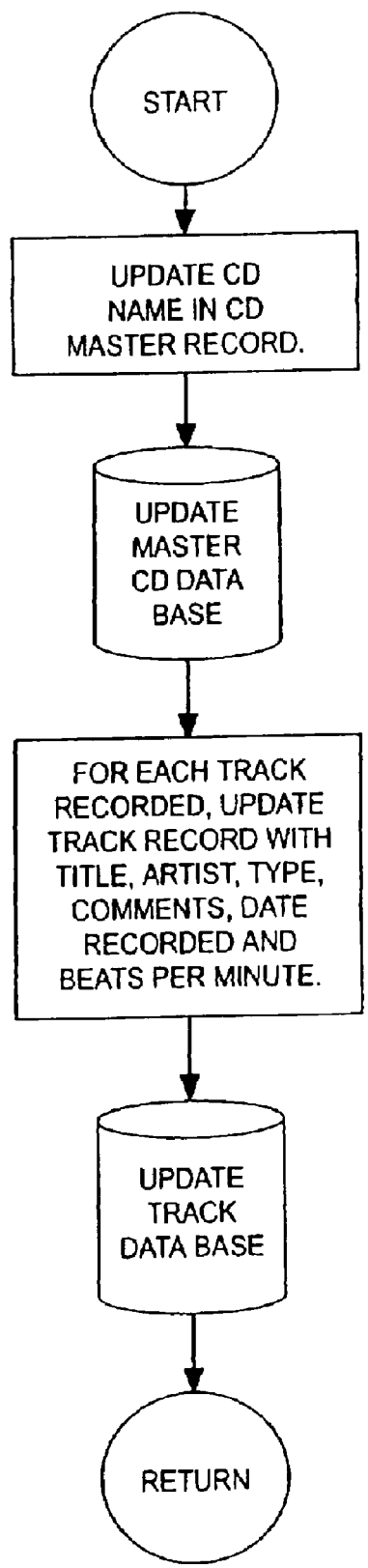

Screen selection is carried out in accordance with the process illustrated in FIG. 3K. Updating of data from the record screen is carried out in a process illustrated in FIG. 3L.

Figure 3M:
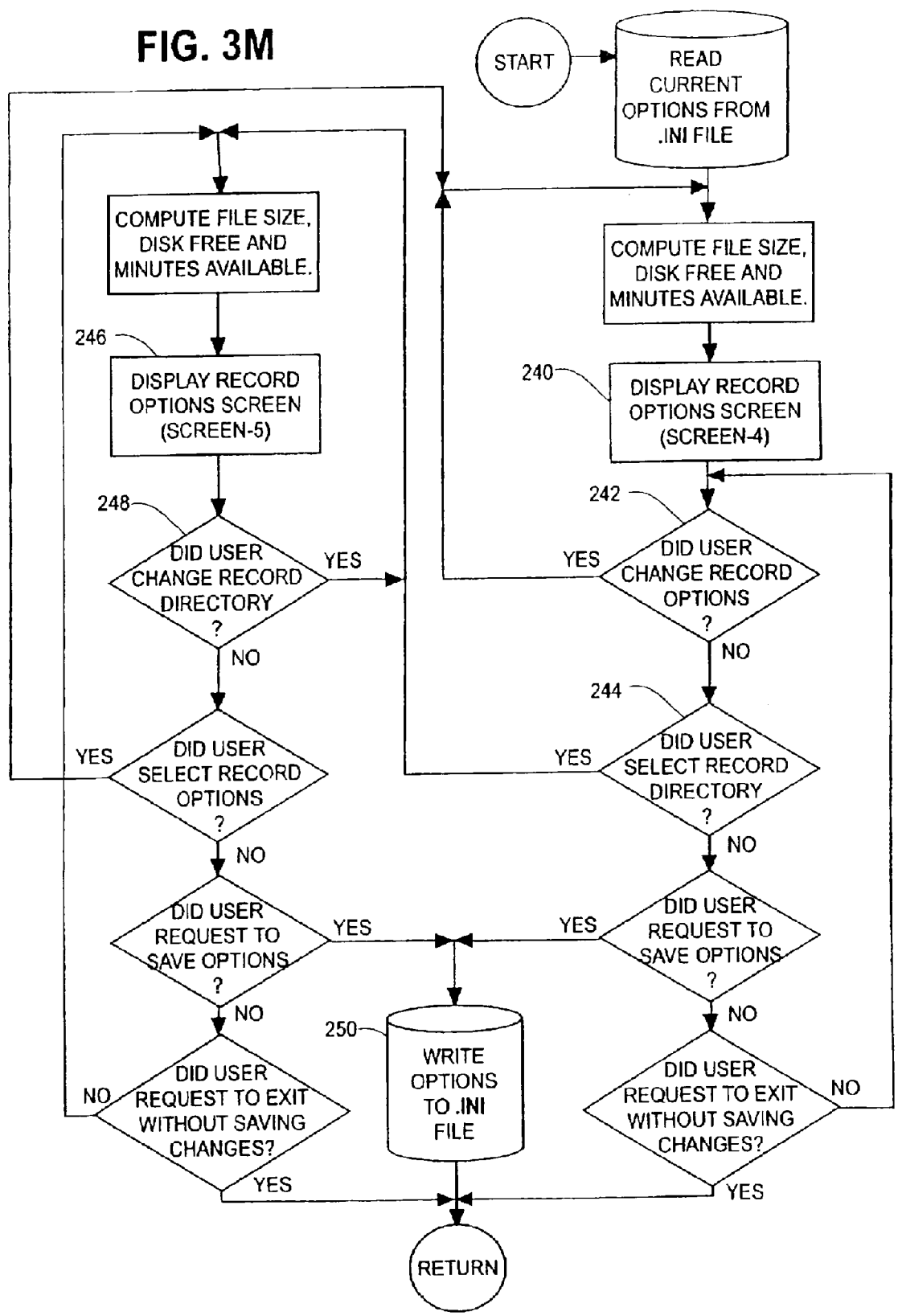

FIG. 3M illustrates steps associated with carrying out requests for various optional functions. For example, in a step 240 an option screen, FIG. 4D, can be displayed for a user.

The user can subsequently in a step 242 change the record options. In the event that the user in a step 244 selects a record directory, the record directory screen FIG. 4E can be displayed in a step 246. The displayed screen can be altered by the user in a step 248. The revised record options can be stored in a step 250 for subsequent use.

Figure 3N:
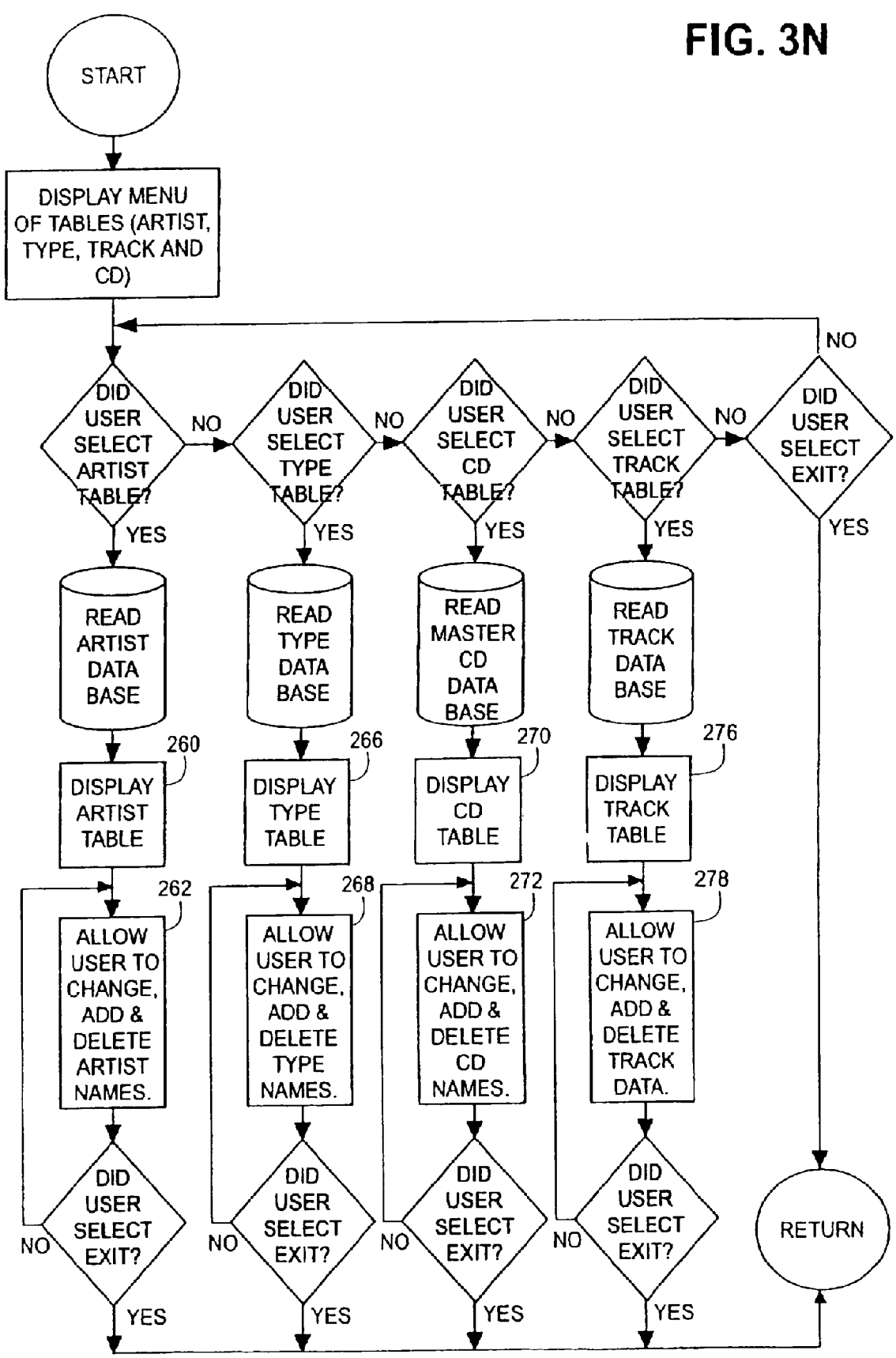

FIG. 3N illustrates steps of a process wherein the user is able to select and display various tables. In a step 260 an artist table can be displayed and edited in a step 262. In a step 266 the type table can be displayed and edited in a step 268. In a step 270, the CD table can be displayed and edited in a step 272. The track table can be displayed in a step 276 and edited in a step 278.

FIG. 3O illustrates the steps in a process of saving the playlist screen, FIG. 4I. In a step 290 the playlist save screen is displayed. In a step 292, if the user has selected to save the existing playlist, the changes are written to the respective database in a step 294. If the user elected to save the new playlist in a step 296, the changes are written to the new playlist database in a step 298. Finally, the user can discard the changes and exit in a step 300.

Figure 3P:

FIG. 3P illustrates the steps of a procedure for deleting a selected work or track.

Hence, as described above, the system 10' can be used to create new or modified playlists, and execute same thereby presenting the sequence of works to a user. Alternately, pre-existing playlists can be edited and additional new playlists created which then subsequently can be executed.

Those of skill in the art will understand that other functions as illustrated in FIGS. 3A-3P will also be provided by the control program 16. Attached hereto is a preferred data structure for use with the flow diagrams of FIGS. 3A-3P.

Figure 5:
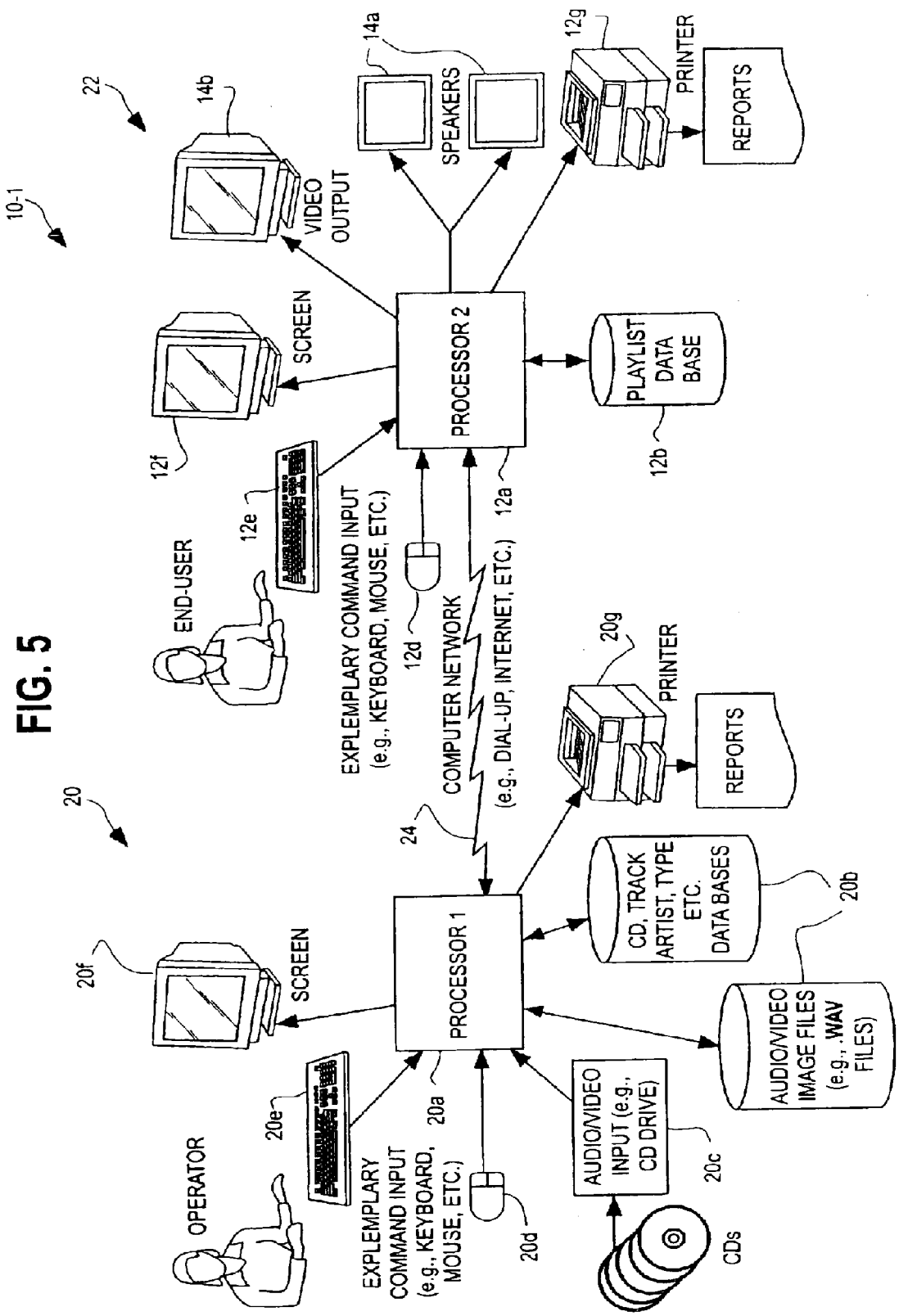
FIG. 5 is a block diagram of a system intended to receive audio or visual works from a remote source.
Figure 6:
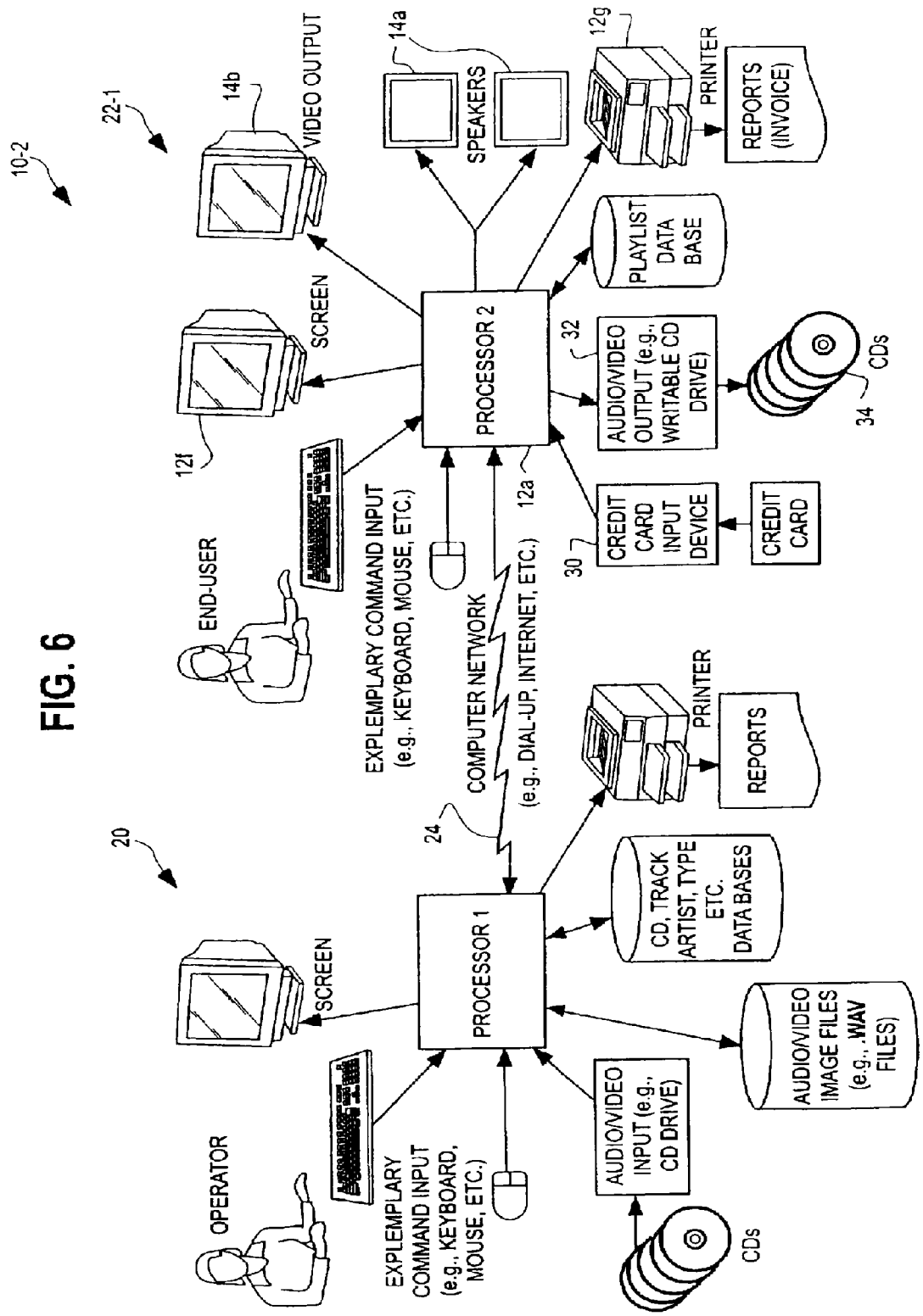
FIG. 6 is a diagram of a system intended to provide a custom written medium of works obtained from a remote source and in response to establishing a predetermined credit.

FIGS. 5 through 7 illustrate alternate types of list building systems. FIG. 5 illustrates a system 10-1 which is a network based playlist creating and executing system. The system 10-1 incorporates a remote source 20 of works which are to be assembled and played or presented at a user's unit or terminal 22. The unit 20 is intended to be an element or a location accessible via a network. For example, the unit 20 can be a location on an intranet or the internet or any other network. It can be accessed via a land line or wireless communication link 24 without limitation.

The system 20 incorporates a processor 20a, and databases 20b. The databases 20b include stored digital representations of a variety of works which can be obtained off of local drives, such as the drive 20c without limitation. The remote system operator has available standard input control devices such as mouse 20d, keyboard 20e or other desired input devices. A display screen 20f of the conventional variety is also provided. The remote system 20 also includes an optional printer 20g for purposes of creating hard copy reports for invoicing, billing or royalty payment purposes without limitation.

The system 20 provides a remote pre-stored inventory which the unit 22 can access via communication link 24. The unit 20 provides supervisory and billing services in response to requests by the end user's unit 22 for access to one or more of the works stored in the inventory in the databases 20b.

Subsequent to the request being authorized, the selected works can be made available to the terminal 22 via the communication link 24. The unit 22 can in turn be used as described previously to create new playlists, edit existing lists and then execute the lists under the control of the local end user. The terminal 22 is especially convenient for the end user in that the works can all be acquired electronically and there is absolutely no need for acquiring and keeping a plurality of CDs.

If desired, processor 12a in system 10-1 can keep track of the number of plays and total play time and transmit that information to processor 20a, for billing purposes. Reports producible by the processor 20a include total plays and play time along with invoices for end users. Documentation for royalty payments to the appropriate recipients can also be created. Finally, the reports can list those works by demand or popularity by day, week or month.

FIG. 6 illustrates a system 10-2 which includes a remote source, such as the remote source 20 and a local terminal 22-1. Terminal 22-1 includes elements similar to the terminal 22 previously discussed. Corresponding elements are identified with the same identification numeral.

The terminal 22-1 additionally includes a credit establishing input such as a credit card reader 30. The reader 30 can be used by a user to make a credit card account number available to the terminal 22-1 for billing purposes.

Once a credit line has been established, the user will be able to use the terminal 22-1 to create and/or modify one or more playlists into write the selected media elements via an output drive 32 to a removable medium 34 which could be a CD or a DVD.

The terminal 10-2 could be located in a business establishment and users interested in obtaining a custom combination of works can access the services of the terminal 22-1 via the reader 30 for purposes of creating and writing the desired sequence of works on the medium 34. Other services made available by the terminal 22 can also be made available by the terminal 22-1 in response to the established credit line.

Additional services that can be made available by the terminal 22-1 include printing invoices via the printer 12g. Report information can be transmitted to the system 20 for billing purposes with respect to the commercial establishment where the terminal 22-1 is located as well as making royalty payments to appropriate recipients.

FIG. 7 illustrates an alternate system 10-3 which can be used for entertainment purposes in public establishments. The system 10-3 provides jukebox-like services at the terminal 22-2. These are under the supervision and control of remote system 20.

The terminal 22-2 includes a credit establishing device which could be a coin or a bill receiving unit 40 of a type used with vending machines. Alternately, the unit 40 could also accept credit cards if desired.

Upon establishing an appropriate credit via the unit 40, the terminal 22-2 enables a user to select one or more works whose titles might be displayed on the control screen 12f via the input devices 12d, 12e.

The selected works could be resident at the local database 12b or could be acquired from the remote unit 20 via the communication link as discussed previously. The system 22-2, unlike conventional jukeboxes, has an unlimited selection of audio or audio/video works available to it via communication link 24. In addition, for security purposes, the terminal 22-2 does not include an inventory of valuable CD or DVD media. The works could include audio works, such as music, audio/visual works such as advertisements, music videos or others.

The terminal 22-2 presents a rolling playlist on the screen 12f which can be reviewed by the end user or individual selecting the works to be presented. Newly selected or identified works are added at the end of the playlist and are presented via speakers 12a and video output 12b in sequence depending on the nature of the work. Hence, the terminal 22-2 makes possible the presentation of arbitrarily selected works, in an arbitrary order in response to the credit established by the unit 40.

The remote system 20 via the link 24 monitors the works being presented and the frequency thereof. Billing information can be generated for purposes of charging the entity where the terminal 22-2 is located for each work which is presented. Reports can be produced at the system 20 identifying royalties to be paid to the appropriate recipients based on the works selected for presentation at the terminal 22-2 or for any other desired purpose. It will be understood that the appropriate file type would be used with the appropriate type of work.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

DATA STRUCTURE

| Table | Field Name | Data Type | |
|---|---|---|---|
| Master CD | CD Number | Long Integer | Created by the track times |
| | CD Title | Text 50 | |
| Track | CD Number | Long Integer | Link to Master CD table |
| | Track | Byte | Track number found on the CD |
| | Artist Code | Integer | Link to the Artist table |
| | Type Code | Long Integer | Link to the Type table |
| | Track Title | Text 50 | |
| | Track Time | Long Integer | Actual time recorded in seconds |
| | File Name | Text 255 | Path/File Name of stored WAV file |
| | Beats | Integer | Beats per minute |
| Playlist Master | Number | Counter | Database assigned key |
| | Title | Text 50 | |
| Playlist Detail | Number | Integer | Link to Playlist table |
| | Play Order | Integer | Order the track was placed within the playbook |
| | CD Number | Long Integer | Link to Track table |
| | Track | Byte | Link to Track table |
| Artist | Artist Code | Counter | Database assigned Artist index |
| | Artist Name | Text 255 | |
| Type | Type Code | Counter | Program assigned index to Music Type |
| | Music Type | Text 50 | |

We claim:

1. A system for selective playback of resident and nonresident digital works at a local terminal, comprising:

a first digital storage medium at a location remote from the local terminal;

said first digital storage medium adapted to store a first plurality of individually accessible digital works;

a first processor adapted to store a first list of at least a portion of said first plurality of digital works from said digital database;

a communications link adapted to convey at least a portion of said first list to the local terminal;

a second digital storage medium accessible by and disposed at or near said local terminal;

said second digital storage medium adapted to store a second plurality of individually accessible digital works;

a second processor adapted to create at said local terminal a second list of at least a portion of said second plurality of digital works;

a display adapted to display at least portions of said first and second lists;

said second processor being adapted to process user selections of digital works from said displayed list, and further adapted to create an executable playlist from said selections;

said display being further adapted to display at least a portion of said playlist;

said second processor being further adapted to process additional user selections of one or more digital works from said playlist;

said second processor being further adapted to play said selected digital work from said local storage medium when said selected digital work is stored in said local storage medium; and said second processor being further adapted to communicate the identity of said selected digital work to said digital database over said communications link when said selected digital work is not stored in said local storage medium.

* * * * *